United States Patent [19]
Uchiyama et al.

[11] Patent Number: 6,163,409
[45] Date of Patent: Dec. 19, 2000

[54] OPTICAL HEAD, OPTICAL COMPONENT FOR USE THEREIN, METHOD OF MANUFACTURING THE SAME, AND OPTICAL DISK APPARATUS

[75] Inventors: Mineharu Uchiyama; Isao Hoshino; Kazushige Mori; Yoshiharu Imaoka, all of Yokohama, Japan

[73] Assignee: Kabushiki Kaisha Toshiba, Kawasaki, Japan

[21] Appl. No.: 08/960,263

[22] Filed: Oct. 29, 1997

[30] Foreign Application Priority Data

| | | | |
|---|---|---|---|
| Oct. 30, 1996 | [JP] | Japan | 8-288331 |
| May 20, 1997 | [JP] | Japan | 9-129604 |
| May 16, 1997 | [JP] | Japan | 9-127397 |

[51] Int. Cl.[7] ................................................. G02B 27/14
[52] U.S. Cl. ............................................................ 359/634
[58] Field of Search ............................... 359/634, 589; 369/112; 385/116

[56] References Cited

U.S. PATENT DOCUMENTS

| | | | |
|---|---|---|---|
| 5,513,164 | 4/1996 | Tanaka et al. | 369/112 |
| 5,615,200 | 3/1997 | Hoshino et al. | 369/112 |
| 5,661,711 | 8/1997 | Tanaka et al. | 369/112 |

FOREIGN PATENT DOCUMENTS 6-195743  7/1994  Japan .

*Primary Examiner*—Ricky Mack
*Attorney, Agent, or Firm*—Pillsbury Madison & Sutro LLP

[57] ABSTRACT

An optical head comprising two light sources, a beam splitter, and two photodetectors. The first light source emits a first light beam to be applied to the recording surface of a first-type optical disk. The second light source emits a second light beam to be applied to the recording surface of a second-type optical disk. The first light beam and the second light beam intersect with each other at an angle other than 90°. The beam splitter is provided at the intersection of the first and second light beams. The beam splitter guides both light beams in a common optical path which extends to the recording surface of either optical disk. The beam splitter guides the first light beam reflected from the first-type optical disk toward the first light source, and the second light beam reflected from the second-type optical disk toward the second light source. The first photodetector detests the first beam reflected from the first-type optical disk. The second photodetector detests the second beam reflected from the second-type optical disk.

5 Claims, 26 Drawing Sheets

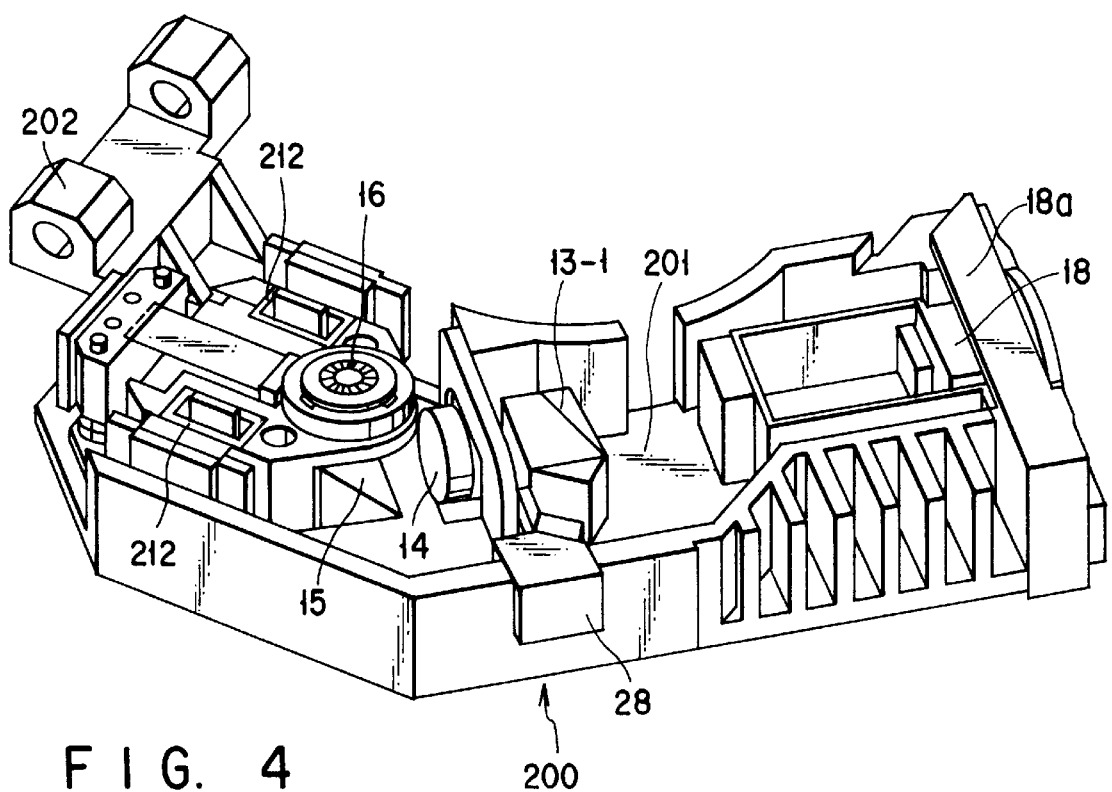
F I G. 4
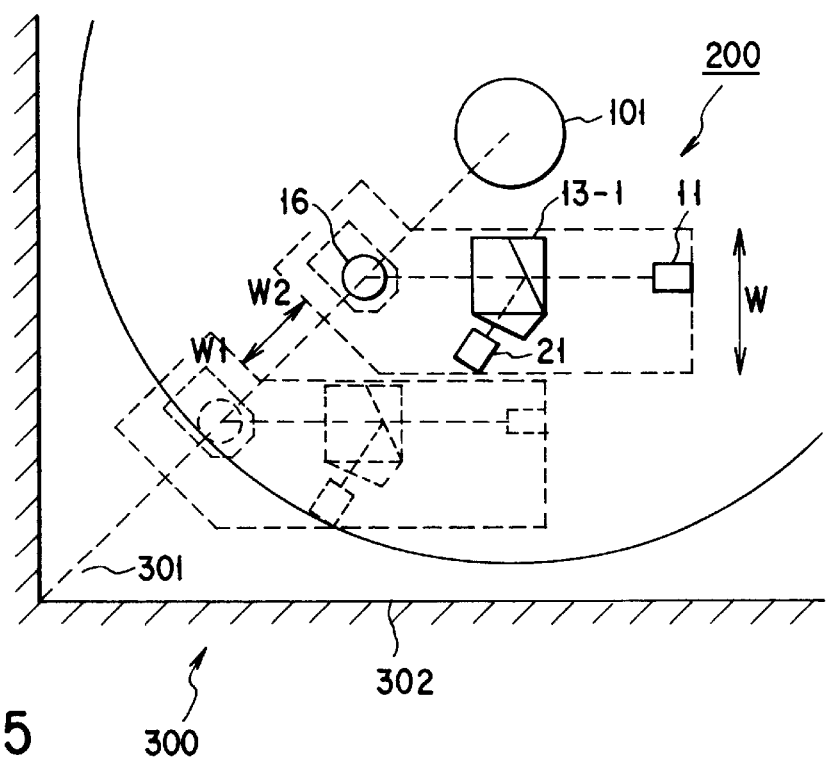
F I G. 5

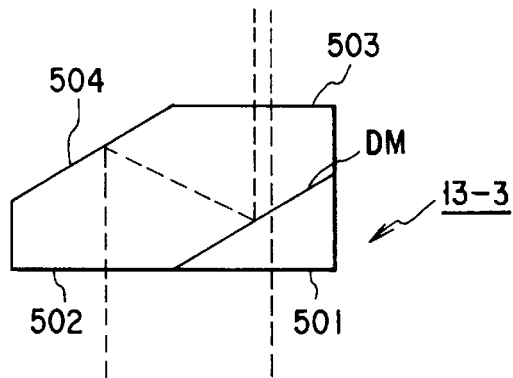
F I G. 8A
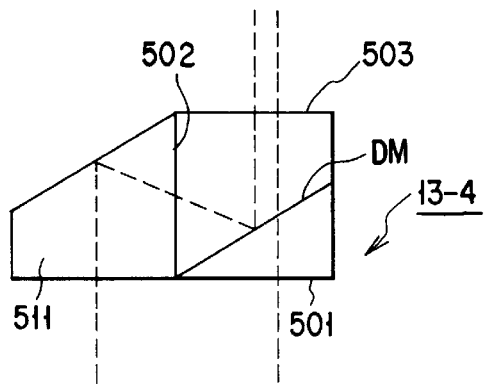
F I G. 8B
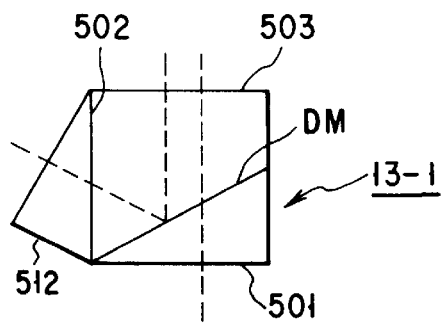
F I G. 8C
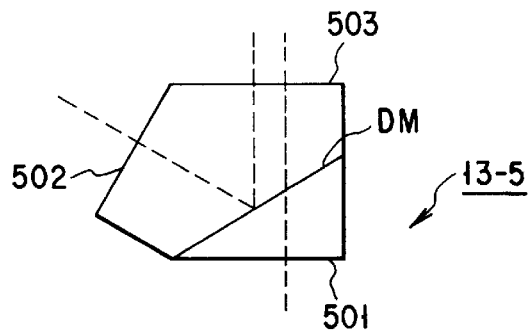
F I G. 8D

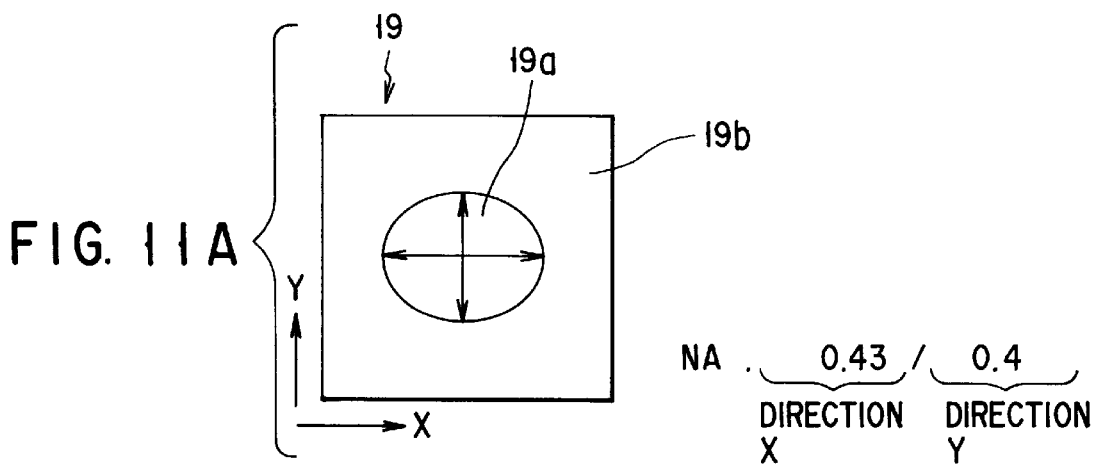
FIG. 11A
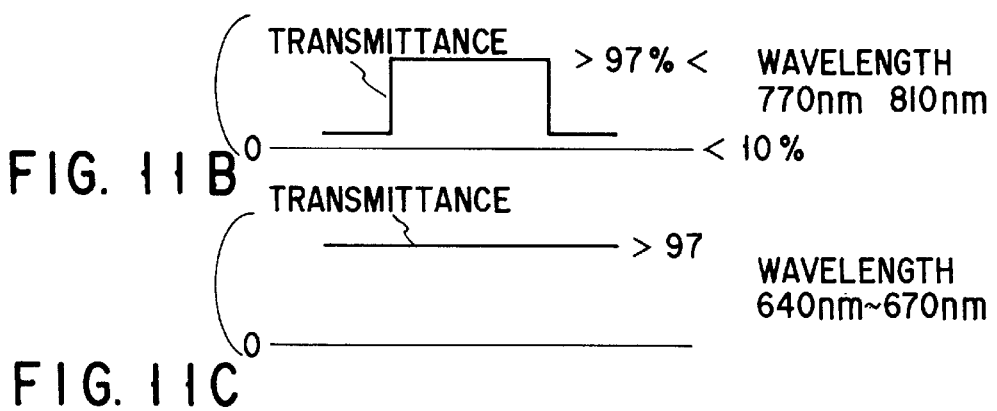
FIG. 11B
FIG. 11C
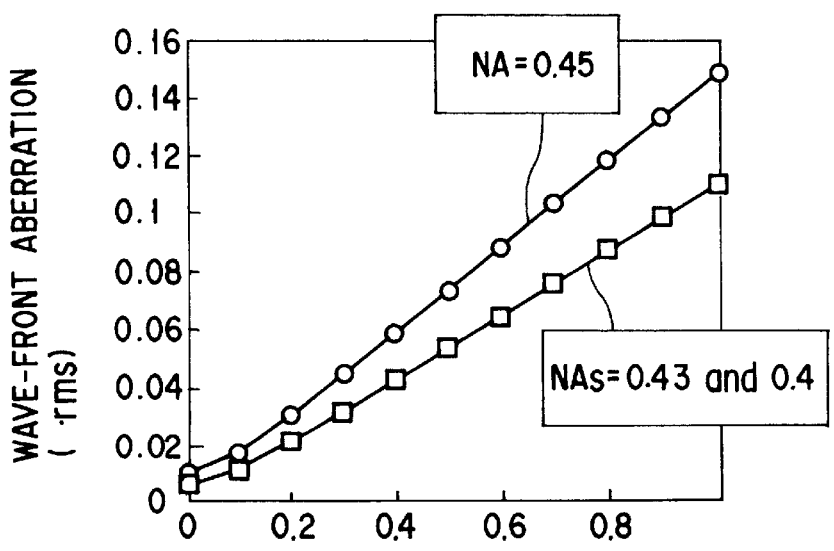
FIG. 11D

CIRCULAR PHASE-ADJUSTING REGION
(NA = 0.45)
T: ALONG TANGENT
R: ALONG RADIUS

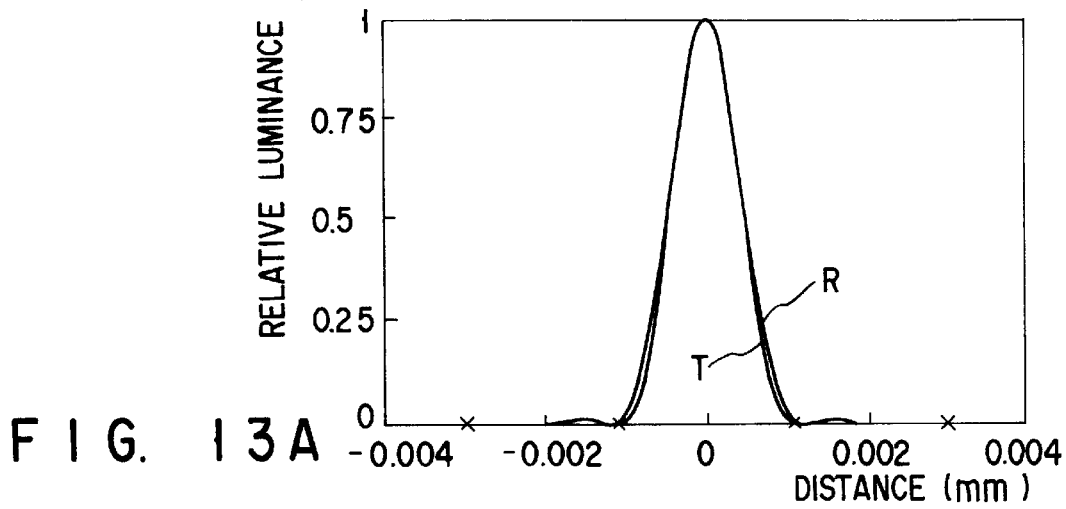
F I G. 13A
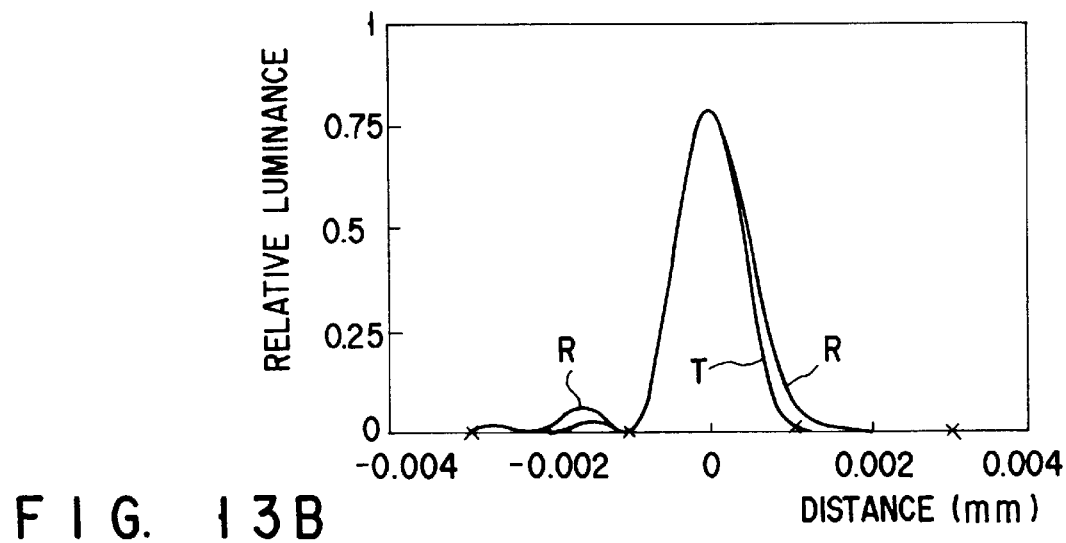
F I G. 13B
ELLIPTICAL PHASE- {T:ALONG TANGENT (NA=0.43)
ADJUSTING REGION   R:ALONG RADIUS (NA=0.40)
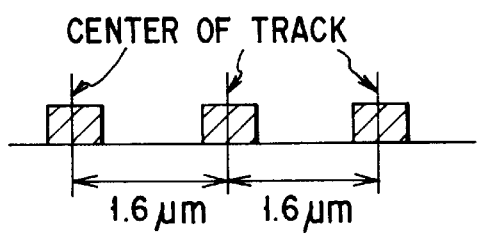
F I G. 13C (FIRST LIFT-OFF PROCESS)

(SECOND LIFT-OFF PROCESS)

(DICING)

(LIFT-OFF PROCESS)

(DICING)

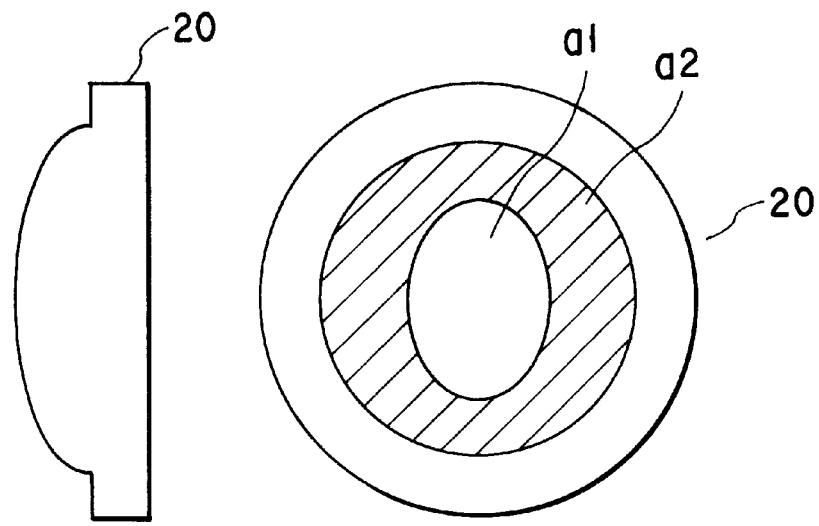
F I G. 16A    F I G. 16B
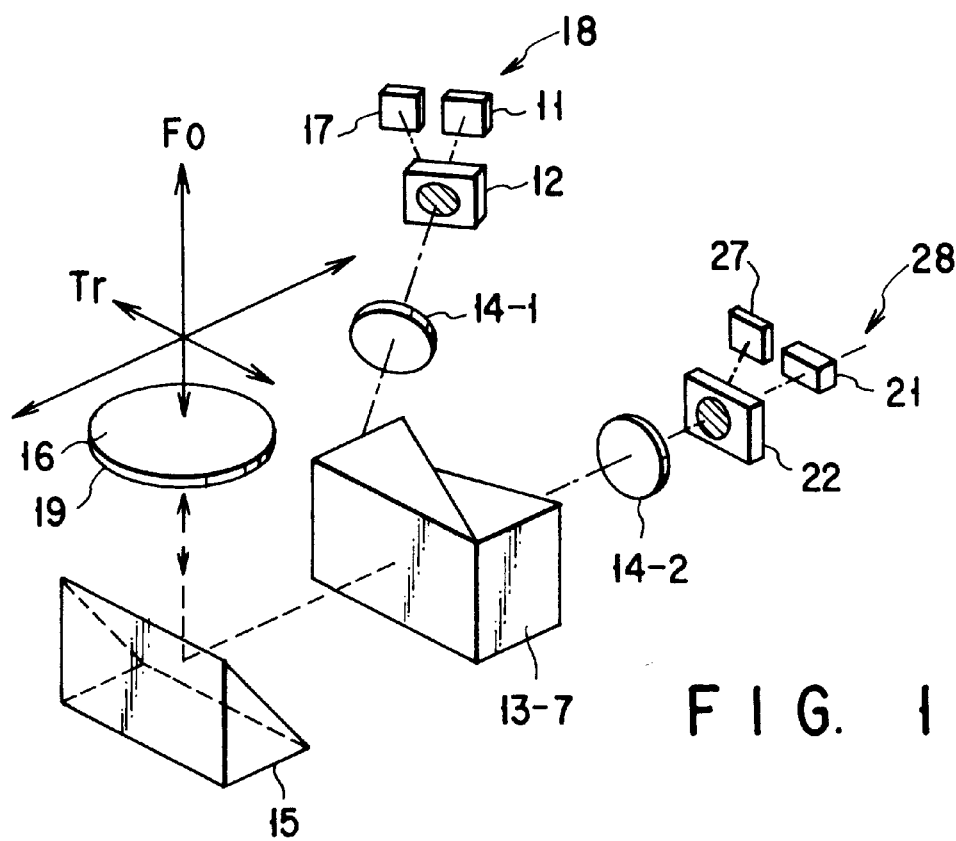
F I G. 18

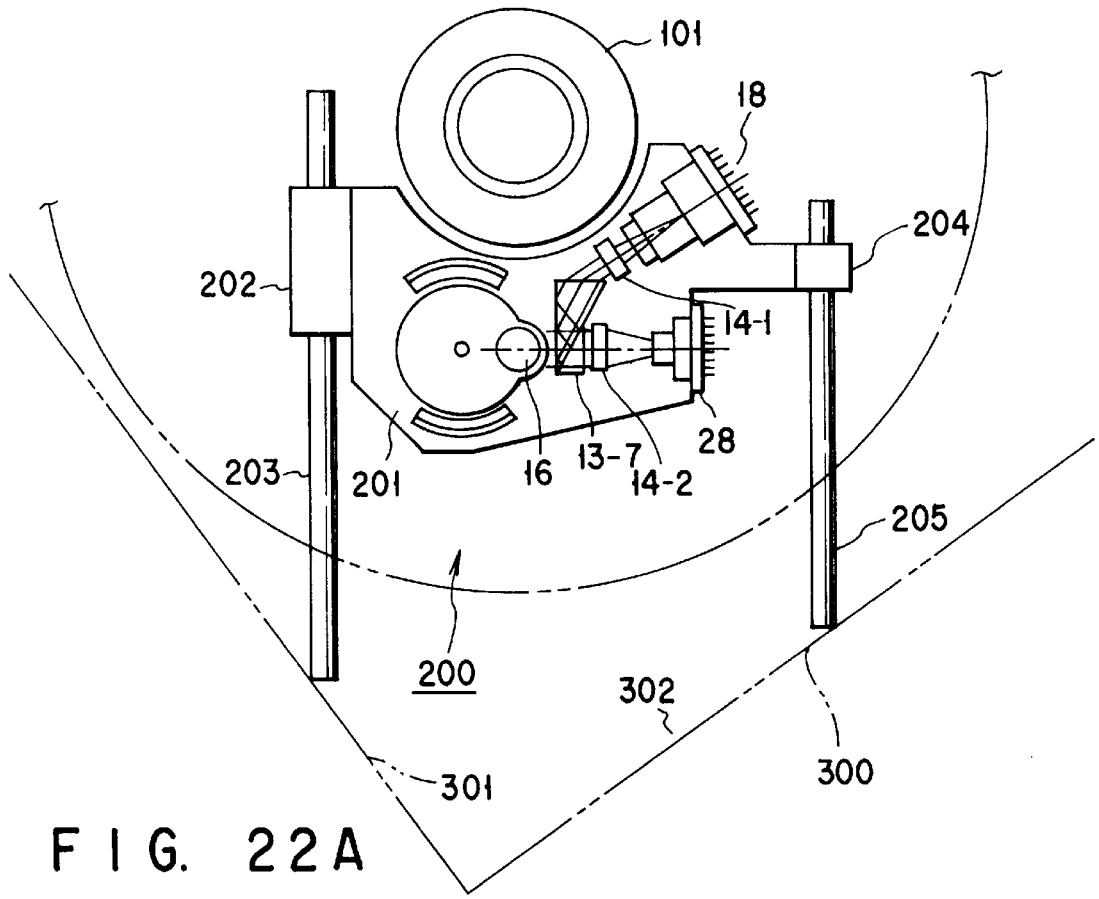
FIG. 22A
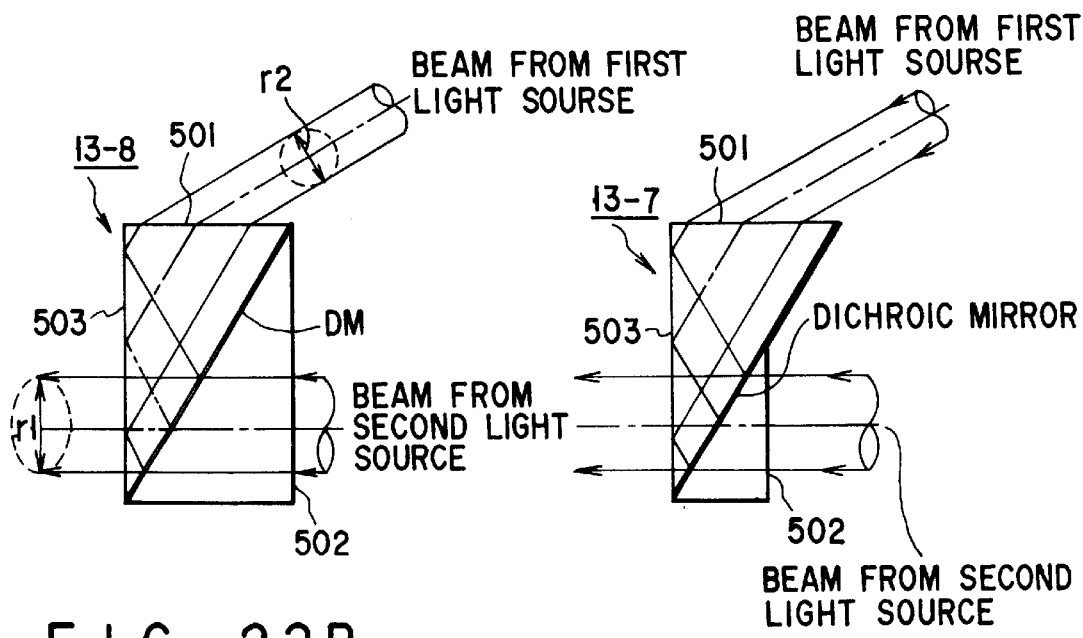
FIG. 22B
FIG. 22C

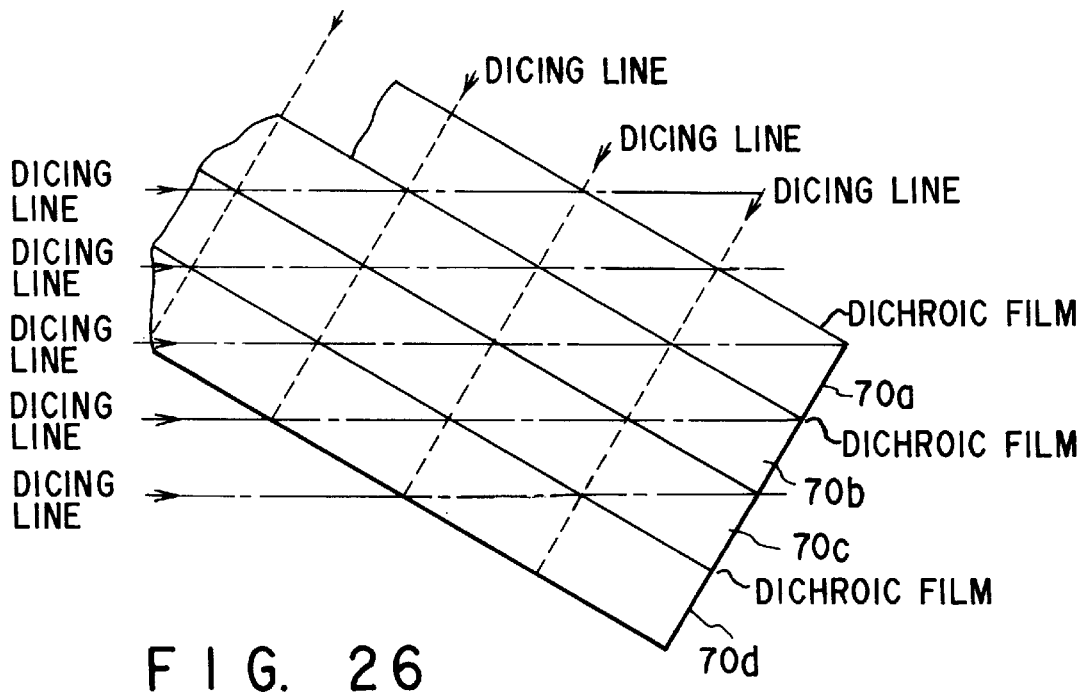
F I G. 26
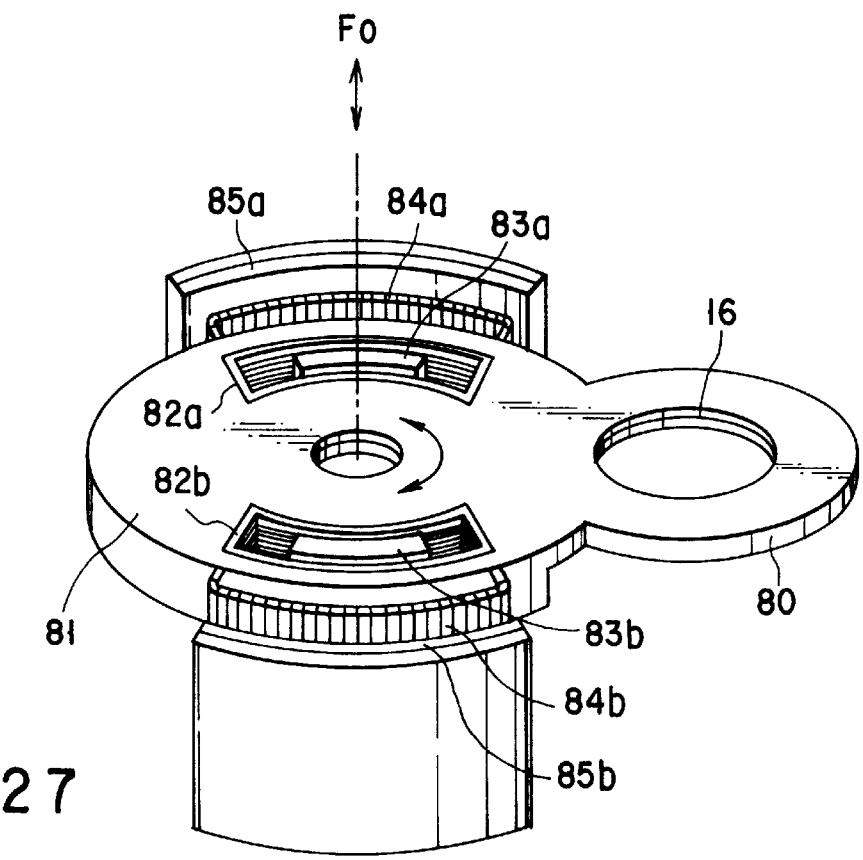
F I G. 27

OPTICAL HEAD, OPTICAL COMPONENT FOR USE THEREIN, METHOD OF MANUFACTURING THE SAME, AND OPTICAL DISK APPARATUS

BACKGROUND OF THE INVENTION

The present invention relates to an optical head for recording signals on, and reproducing signals from, an optical disk, optical components of the optical head, a method of manufacturing the optical head and the components thereof, and an optical disk apparatus.

A data recording/reproducing system using an optical disk as recording medium, such as an optical disk drive, has an optical head. The optical head applies a laser beam to the optical disk to record data on the optical disk and receives a light beam reflected from the disk to read recorded data from the disk. The optical head comprises an optical system, a focusing control means and a tracking control means, which cooperate to apply a laser beam to a correct position in a recording track provided on the optical disk.

In recent years various types of disks have been developed. The most recently developed optical disk is a digital video disk (DVD). The DVD has the same diameter (i.e., 12 cm) as the compact disk (CD) which is an optical disk hitherto known. The DVD comprises two substrates, each having a thickness of 0.6 mm. The DVD is therefore 1.2 mm thick, as thick as the CD. Since signal-recording substrate is thinner than its counterpart of the CD, the accuracy of recording signals on and reproducing them from the substrate is less influenced when the substrate is tilted. The DVD therefore has a recording density much higher than that of the CD. It can record as much information as 4.7 GB (gigabytes).

The tracks formed on the DVD are arranged at intervals of 0.74 $\mu$m, about half the track interval of the CD (i.e., 1.6 $\mu$m). To record signals on and reproduce them from the DVD, an optical head is used which emits a laser beam having a wavelength ranging from 640 nm to 670 nm. This wavelength is shorter than the wavelength (i.e., 770 nm to 810 nm) of the laser beam applied to a CD. In the optical system of the optical head, a laser beam must be focused to have a diameter small enough to read data from the DVD. To read data from the CD, a laser beam must be focused to have a diameter adapted to the track interval of the CD.

It is demanded that the optical head for reading signals from a DVD be designed to read signals from a CD as well. In this regard, it should be noted that an optical head for reading data from a DVD must have a light source which emits a laser beam having a wavelength short enough to read data from the DVD and also an optical system which forms a laser beam spot small enough to read data from the DVD.

On the other hand, an optical head for reading signals from a CD must have a light source which emits a more intense laser beam having a wavelength of 780 nm to read/write data from/to a CD-R (a recordable CD) or a CD-RW (a rewritable CD) and also an optical system which forms a beam spot suitable for reading/writing data from/to the CD-R or CD-RW.

An optical head has been designed which can read signals from both a DVD and a CD. The optical head comprises one light source and two optical systems. The light source emits a beam having a waveform ranging from 640 nm to 670 nm. The first optical system focuses the beam, forming a beam spot which suitable for reading data from the DVD, and the second optical system focuses the beam, forming a beam spot suitable for reading data from the CD. The first optical system or the second optical system must be moved to a position where it can focus the beam, in accordance with whether a DVD or a CD is used. Needless to say, the mechanism has many movable parts. Comprising two optical systems and many movable parts, the optical head can hardly be made sufficiently small and may malfunction when vibrated.

Another type of an optical head has been devised which can read signals from both a DVD and a CD. A head of this type is shown in, for example, FIG. 21 of Jpn. Pat. Appln. KOKAI Publication 6-195742. This optical head has two light sources and one optical system. The first light source emits a beam suitable for reading data from a DVD, while the second light source emits a beam suitable for reading data from a CD. It is demanded that the optical head having two optical heads be modified to become smaller and be improved in performance.

BRIEF SUMMARY OF THE INVENTION

A first object of the present invention is to provide a an optical head which has two light sources, switched from one to the other by electric means in accordance with the type of an optical disk, which is resistant to vibration, and which can be miniaturized.

A second object of the invention is to provide an optical head which can be made thin.

A third object of this invention is to provide an optical head which is easy to maintain and which operate stably.

A fourth object of this invention is to provide an optical head which suppresses wave-front aberration to have improved optical characteristics, even if the objective lens is moved across its optical axis.

A fifth object of the present invention is to provide an optical disk apparatus which comprises a small optical head of the type described above and which is therefore relatively small as a whole.

A sixth object of this invention is to provide an optical component which has such wavelength characteristic as to guide efficiently laser beams emitted from two light sources to an optical disk and to guide the beams reflected from the optical disk to two photodetector along two different optical paths, respectively.

A seventh object of the invention is to provide a dichroic filter which can suppress the deformation of a beam spot which occurs as an object lens is moved to achieve focusing control and tracking control, thereby to reduce the signal-reading error.

An eighth object of the invention is to provide a method of manufacturing a dichroic filter in a few steps and with high precision.

A ninth object of the present invention is to provide a dichroic filter with an objective lens, which excels in optical characteristics.

According to the invention, there is provided an optical head and an optical disk apparatus having an optical head. The optical head has a first light source for emitting a first light beam to a first-type optical disk and a second light source for emitting a second light beam to a second-type optical disk. The first and second light beams intersect with each other at an angle other than 90°. The optical head has a beam splitter provided at the intersection of the first and second light beams. The beam splitter guides both beams in a common optical path.

Having two light sources, the optical head can apply an optimal light beam to the first-type optical disk and an optimal light beam to the second-type optical disk. Since the second light beam intersect with the first light be am at an angle other than 90°, the optical head can have a small width as measured in the radial direction of the optical disks. This helps to miniaturize the optical head.

The optical head may further comprise a collimator lens provided on the common optical path and positioned between the beam splitter and the first-type or second-type optical disk. The first light source may be located at a focal point of the collimator lens, and the second light source may be located at a shorter distance from the collimator lens than the focal point of the collimator lens. The first light source which needs to have high performance is located at the focal point of the collimator lens. Thus, aberration will hardly occur in spite of the servo control of the objective lens which has been designed optimal for the first light source. Signals can therefore be received with high precision. The second light source which need not have so high performance is located at a shorter distance from the collimator lens than the focal point thereof. Hence, the spherical aberration resulting from the objective lens can be reduced.

Furthermore, since the second light source is so located, the virtual optical path of the light beam emitted from the second light source can be shortened.

The common optical path extends at 45° to a direction in which the objective lens is moved to achieve tracking control. Thus, although the optical head must be at least as long as the optical path of the beam, its housing can be bent. The optical head can therefore be relatively small as a whole.

The axes of the common optical path and first beam are exist in the same line. In this case, width of the housing including the optical head can be made rather small than the first beam is bent by an optical component.

Of two light sources, the one which generates more heat than the other may be provided on the elongation line of the common optical path. In this case, the light source generating more heat is positioned at one end of the optical head apparatus, and the heat this light source generates is radiated efficiently.

The beam splitter is provided near a center of gravity of the optical head. The beam splitter is mounted near the center after the other optical components are arranged in the case. The optical head can therefore be moved more stably and smoothly than otherwise.

According to the invention, there is provided an optical head and an optical disk apparatus having an optical head. The optical head has a light source for emitting a first light beam; an objective lens; and a mirror provided below the objective lens. The mirror guides the laser beam to the objective lens in a path inclined at about 90° to a direction in which the objective lens is minutely moved to achieve tracking control.

In this optical head, a beam spot moves on the reflecting surface of the mirror in a direction parallel to the surface of an optical disk as the objective lens is moved to achieve tracking control. The height of the reflecting surface can therefore be reduced, making it possible to render the optical head thinner than otherwise.

The beam splitter has a first surface for receiving the first light beam, a second surface for receiving the second light beam having a wavelength different from that of the first light beam, a dichroic mirror opposing the first and second surfaces, for passing the first light beam and reflecting the second light beam. The beam splitter guides the first and second beams to the third surface in the common path even if the first and second light beams are applied to the first and second surfaces, respectively, intersects with each other at an angle other than 90°. If both the first light beam and the second light beam are applied to the second surface, the beam splitter guides the first and second light beams to the first and second surfaces, respectively.

According to the present invention, there is provide a dichroic filter having such light-transmitting characteristic as to allow passage of a first light beam at entire surface, and passage of a second light beam at a central part of the surface. The central part of the surface may be elliptical.

The dichroic filter helps to form a beam spot of a desired shape and size on optical disks of different types. The dichroic filter can suppress the deformation of a beam spot which occurs as an objective lens is moved to achieve focusing control and tracking control. If incorporated in an optical head, the dichroic filter reduces the signal-reading error and enhances the reliability of the optical head.

According to an optical head of the invention, the optical head comprises: a first light source for emitting a first light beam to be applied to a first-type optical disk through the objective lens; a second light source for emitting a second light beam to be applied to a second-type optical disk, through the objective lens, the second light beam intersecting with the first light beam at an angle other than 90°; and the objective lens for focusing the first and second light beams on the first and second-type optical disks, respectively. The optical head further comprises optical means for converting the first light beam and the second light beams to a converging light beam and a diverging light beam, respectively, and applying the converging light beam and the diverging light beam to the objective lens. The first light source and the second light source can be located near the focal point of the optical means.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 4 is a perspective view of the optical head;

FIG. 5 is a diagram the distance and direction for and in which the optical head is moved in the housing of the optical disk apparatus;

FIGS. 8A to 8D are side views of various modifications of the beam splitter incorporated in the optical head;

FIG. 11A is a plan view of the dichroic filter incorporated in the optical heads according to the present invention;

FIGS. 11B and 11C are diagrams illustrating the transmission characteristic of the dichroic filter;

FIG. 11D is a graph showing how wave-front aberration depends upon a numerical aperture the dichroic filter assumes;

FIG. 13A is a graph illustrating the luminance distribution which a beam spot formed of a laser beam passing through the dichroic filter incorporated in the optical head of the invention and having an elliptical phase-matching region exhibits when an objective lens is not shifted;

FIG. 13B is a graph illustrating the luminance distribution which a beam spot formed of a laser beam passing through the dichroic filter incorporated in the optical head exhibits when an objective lens is shifted;

FIG. 13C is a schematic sectional view of the optical disk on which a beam spot is formed whose luminance distributions is illustrated in FIGS. 13A and 13B;

FIGS. 16A and 16B are a sectional view and a plan view of a dichroic filter according to the present invention, which functions as an objective lens, too;

FIG. 18 is a perspective view of an optical head of the fourth type according to the present invention;

FIG. 22A is a plan view of an optical disk apparatus which incorporates an optical head of the fourth type;

FIG. 22B is a plan view of the beam splitter used in the optical head of the fourth type;

FIG. 22C is a plan view of a beam splitter which may be used in place of the beam splitter shown in FIG. 22B;

FIG. 26 is a diagram for explaining a method of manufacturing a beam splitter, according to the present invention;

FIG. 27 is a perspective view of a lens holder and a mechanism for moving an objective lens;

DETAILED DESCRIPTION OF THE INVENTION

Embodiments of the present invention will be described with reference to the accompanying drawings.

Figure 1:
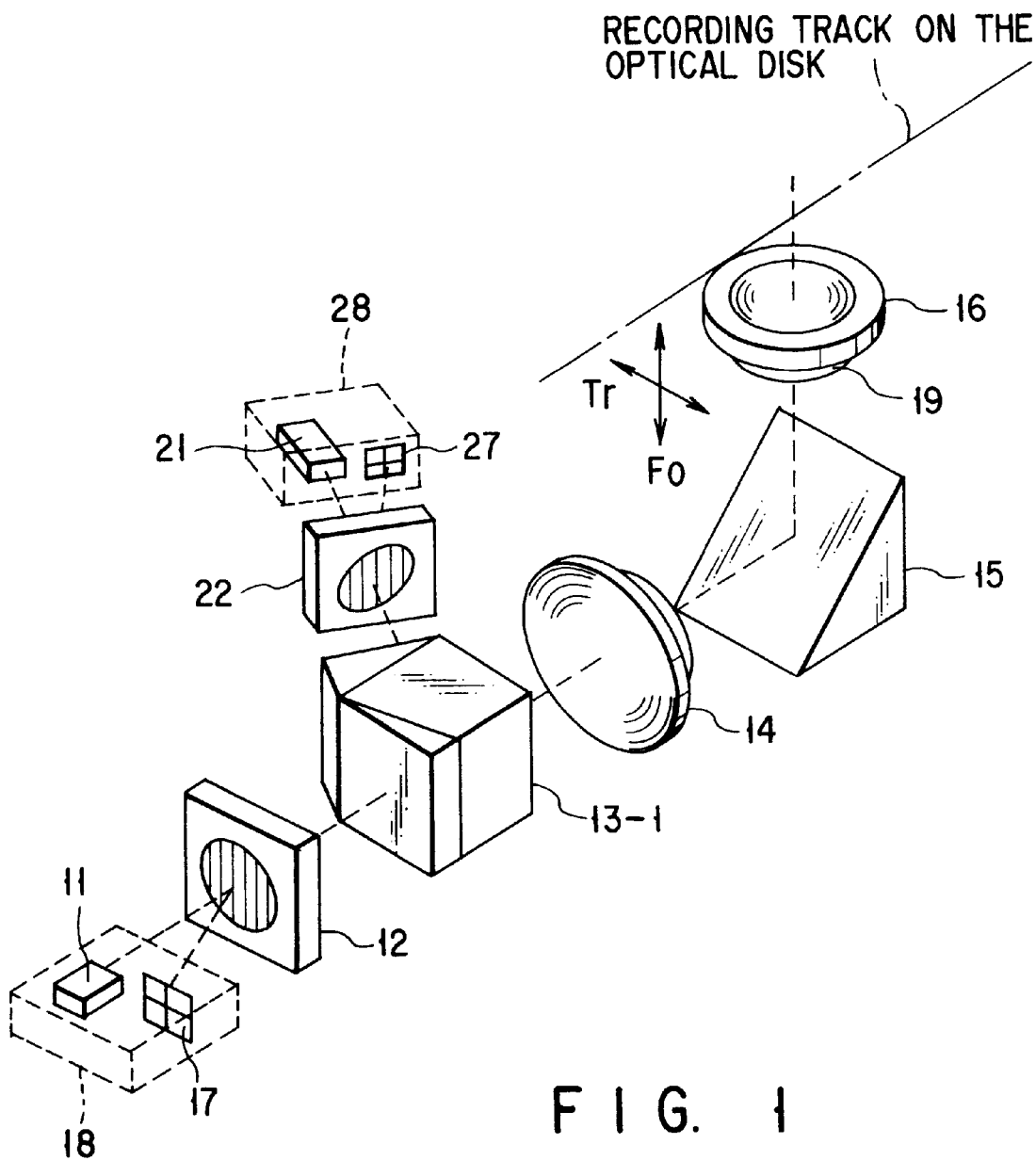
FIG. 1 is a diagram showing an optical head of the first type according to the present invention.

FIG. 1 shows an optical head according to this invention. As shown in FIG. 1, the optical head comprises a first light source 11, a first focusing-error detector 12, a cubic beam splitter 13-1, a collimator lens 14, a prism 15, an objective lens 16, a first photodetector 17, a dichroic filter 19, a second light source 21, a second focusing-error detector 22, and a second photodetector 27. The prism 15 may be replaced by a mirror.

The first light source 11 is a semiconductor laser which emits a laser beam having a wavelength of 650 nm. The beam passes through the first focusing-error detector 12, beam splitter 13-1 and collimator lens 14. The second light source 21 is a semiconductor laser which emits a laser beam having a wavelength different from that of the beam emitted by the first light source 11. The laser beam emitted from the second light source 21 passes through the second focusing-error detector 22 to the beam splitter 13-1. The beam splitter 13-1 reflects this beam and guides the same to the collimator lens 14. The collimator lens 14 focuses a diverging beam, adjusts the diversion of a beam, and converts a beam to a conversing beam or a parallel beam.

The laser beam output from the collimator lens 14, i.e., the beam emitted from the first light source 11 or the second light source 21, is reflected by the prism 15. It is then applied through the dichroic filter 19 and the objective lens 16 to the recording surface of an optical disk. The laser beam forms a beam spot on the recording surface of the disk, which reflects the laser beam. The beam reflected from the recording surface passes through the objective lens 16, dichroic filter 19, prism 15 and collimator lens 14. It is then applied to the beam splitter 13-1.

As long as the first light source 11 is used, the beam splitter 13-1 guides the beam to the first focusing-error detector 12. As long as the second light source 21 is used, the beam splitter 13-1 guides the beam to the second focusing-error detector 22. The focusing-error detectors 12 and 22 achieve hologram diffraction, each guiding the input light beam straight or diffracting by an angle in accordance with the direction in which the light beam is polarized. The light beam diffracted by the first focusing-error detector 12 is applied to the first photodetector 17. The light beam diffracted by the second focusing-error detector 22 is applied to the second photodetector 27.

As seen from FIG. 1, the first light source 11 and the first photodetector 17 constitute a first light source unit 18, while the second light source 21 and the second photodetector 27 constitute a light source second unit 28. This helps render the optical head small.

The dichroic filter 19 is located very close to the objective lens 16. The filter 19 has a variable numerical aperture. When the numerical aperture is set at the minimum value, the optical head can read data from a CD. When the numerical aperture is set at the maximum value, the optical head can read data from a DVD. The objective lens 16 and the dichroic filter 19 can be moved together in two directions Fo and Tr to achieve focusing control and tracking control. More precisely, the lens 16 and the filter 19 are moved in the directions Fo and Tr as the servo circuit (not shown) supplies control signals to the focusing control coil (not shown) and the tracking control coil (not shown, either).

Various design measures are taken to make the optical head be as small as possible.

First, the first and second light sources 11 and 21 are so arranged that the laser beams they emit intersect with each other at an angle other than 90°, and the beam splitter 13-1 is positioned at the intersection of the beams. This helps to reduce the size of the optical head.

Second, the second light source 21 is located at a shorter distance from the beam splitter 13-1 than the focal point of the collimator lens 14. With the second light source 21 so positioned, the beam emitted form the light source 21 and applied through the lenses 14 and 16 can form a spot of a desired shape on the recording surface of a CD. For the same reason the optical head can be made small. Why the second light source 21 should be so positioned will be explained in more detail, with reference to FIGS. 2A to 2D.

As described above, the two substrates constituting a digital video di sk (DVD) have the same diameter (i.e., 12 cm) as the compact disk (CD). Each substrate, however, has a thickness of 0.6 mm, and is therefore 1.2 mm thick, or as thick as the CD. Namely, the distance between the surface and signal-recording surface of substrate is 0.6 mm. Since each substrate is thin, the accuracy of recording signals on and reproducing them from the substrate is less influenced when the substrate is tilted, than in the case of the CD. The DVD therefore has a high recording density and can record as much information as 4.7 GB. The track interval of the DVD is 0.74 μm, about half the track interval of the CD (i.e., 1.6 μm). Hence, a laser beam must be focused before applied to the DVD to read data therefrom, more than a laser beam which will be applied to a CD to read data from the CD.

Generally, when a lens designed for use in reproducing data from a DVD is used to reproduce data from a CD, spherical aberration will occur because the substrate of the CD has a thickness different from that of the DVD. Consequently, the beam emitted from a light source provided for a CD will form an excessively large spot, a deformed beam spot or a ring of light. In this case, the signals read from the CD will be at insufficient levels, or will contain noise.

In order to avoid these problems, the light source provided for the CD is located at a shorter distance from the collimator lens than the focal point thereof. Since the light source is so located, the spherical aberration is reduced which occurs at the objective lens when the light source. As a result, the light beam form a spot of a desired shape on the CD.

Figure 2A:
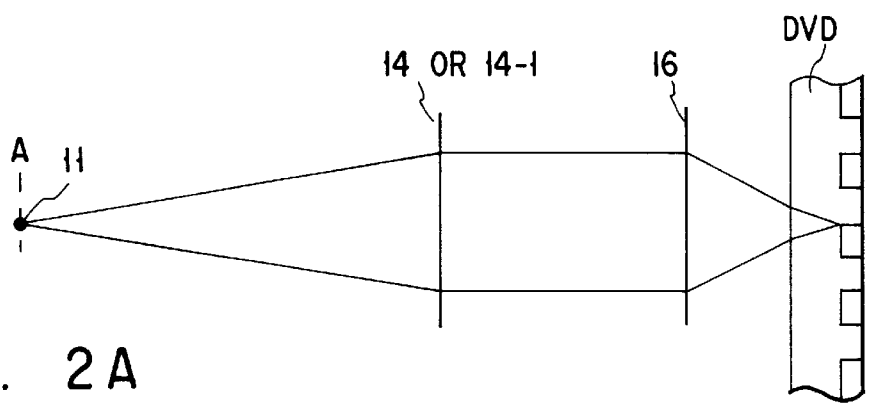
FIGS. 2A to 2D are diagrams presenting various positions the light sources may assume in the optical head shown in FIG. 1.

More specifically, the first light source 11 is located at the focal point A of the collimator lens 14 as shown in FIG. 2A, whereby the lens 14 converts the laser beam emitted from the light source 11 to a parallel beam. Alternatively, the light source 11 may be located at a longer distance from the lens 14 than the focal point A thereof as illustrated in FIG. 2C, whereby the lens 14 converts the beam emitted from the light source 11 to one which slightly converges toward the objective lens 16. In either case, the objective lens 16 focuses the laser beam, forming a sufficiently small spot on the surface of the thin signal-recording substrate of a DVD.

Figure 2B:
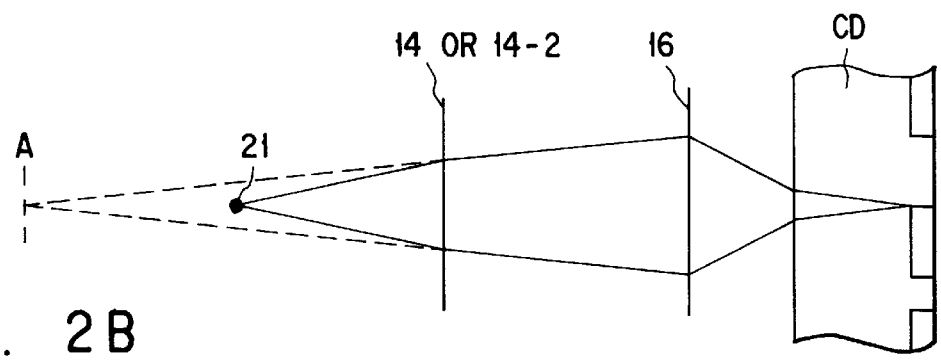
Figure 2C:
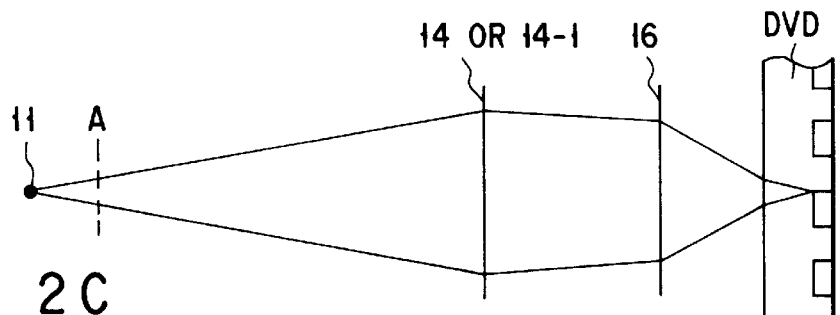
Figure 2D:
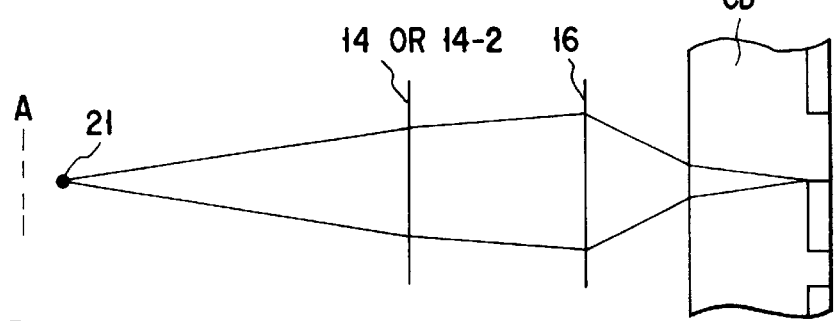

By contrast, the second light source 21 is located at a shorter distance from the collimator lens 14 than the focal point A thereof as shown in FIG. 2B, whereby the lens 14 converts the laser beam emitted from the light source 21 to one which diverts toward the objective lens 16. Alternatively, as shown in FIG. 2D, the econd light source 21 may be located at a shorter distance from the lens 14 than the focal point thereof, but not so short a distance from the lens 14 as in the case illustrated in FIG. 2B, whereby the lens 14 converts the beam emitted from the light source 21 to a slightly diverging beam. In either case, the lens 16 focuses the beam, forming a relative beam spot on the surface of the signal-recording substrate of a CD.

Since the second light source 21 is located at a shorter distance from the collimator lens 14 than the focal point A thereof, the optical head can be smaller and can utilize the laser beam more efficiently than otherwise. The second light source 21 is located at a shorther distance from the collimator lens 14 than the focal point A and the diverging beam is output from the collimator lens 14. This means the laser beam from the second light source 21 is high-effectively used. This is desirable particularly when data is written on a disc having a low reflectance.

If the light sources 11 and 21 are located as shown in FIG. 2C and FIG. 2D, respectively, the optical head will exhibit better optical characteristics and will record signals on and read them from a CD more efficiently, as will be explained later.

Figure 3:
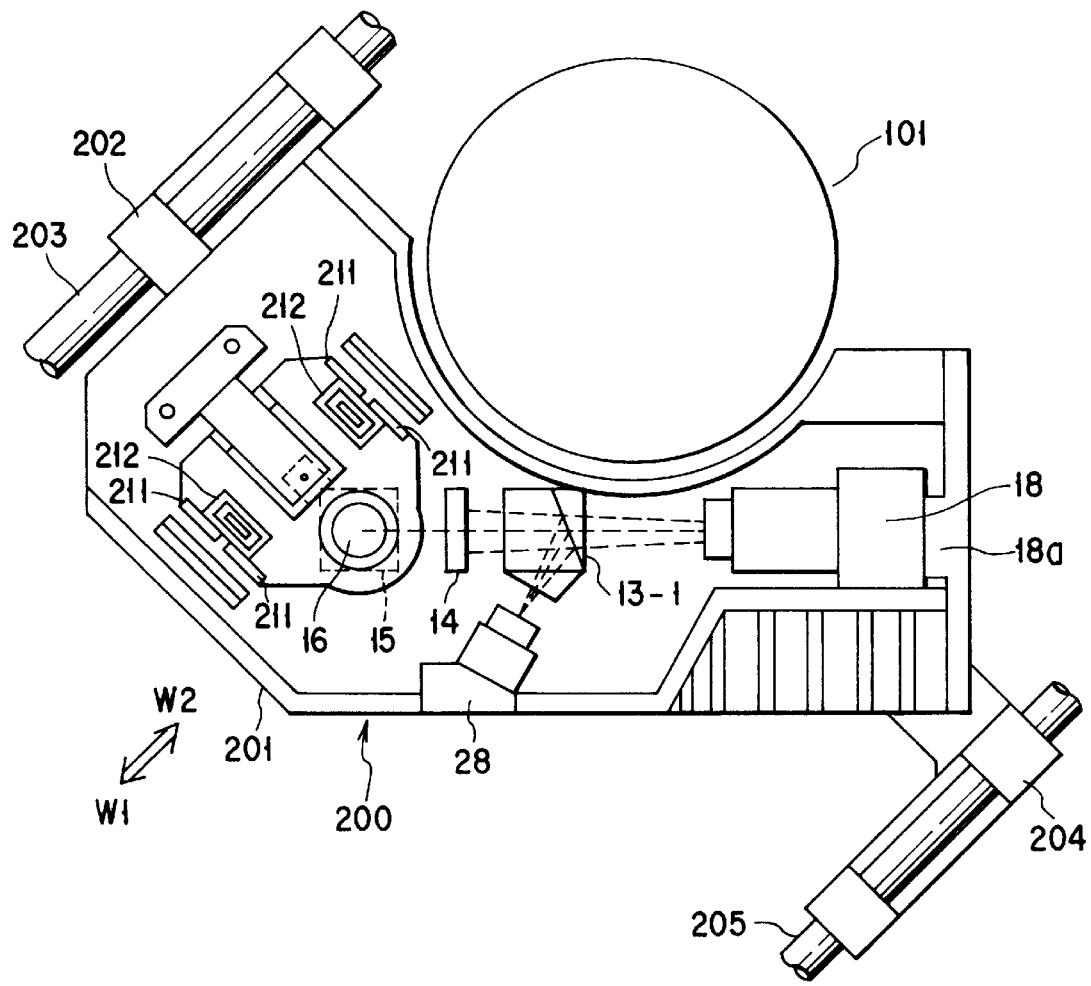
FIG. 3 is a plan view of an optical disk apparatus incorporating the optical head shown in FIG. 1, illustrating the arrangement of the components of the optical head.

The optical head will be further described, with reference to FIGS. 3 and 4. FIG. 3 is a plan view of an optical disk apparatus incorporating the optical head described above. FIG. 4 is a perspective view of the optical head.

As seen from FIG. 3, the optical disk apparatus comprises a disk-driving section 101, an optical head 200 of the type described above, two arms 202 and 204, and two guide rails 203 and 205. A DVD and a CD which differ in thickness can be mounted on the disk-driving section 101, one at at time. The optical head 200 applies a laser beam to the recording surface of the optical disk (a DVD or a CD) mounted on the section 101. The arms 202 and 204 are formed integral with two opposite sides of the housing 201 of the head 200, respectively. The guide rails 203 and 205 are provided outside the housing 201 of the head 200 and extend parallel to each other. The arms 202 and 204 are slidably mounted on the guide rails 203 and 205, respectively. The guide rails 203 and 205 support the optical head 200 at a level above the recording surface of the optical disk mounted on the disk-driving section 101. The optical head 200 can therefore be moved in two opposite directions W1 and W2, along the radius of the optical disk.

The first light source unit 18 for applying a laser beam of the first wavelength to a DVD is secured to the bottom of the housing 201. An optical base 18a surrounds the first light source unit 18 to radiate heat from the unit 18 efficiently. This is important, because the unit 18 generates much heat while operated by a large current and emitting a laser beam of the first wavelength which is relatively short.

A drive section is provided in the housing 201 to move the objective lens 16 to a recording track provided on the optical disk mounted on the disk-driving section 101. The drive section has tracking coils 211, focusing coils 212, and an actuator, which cooperate to move the lens 16 to accomplish tracking control and focusing control. When supplied with control currents, the focusing coils 211 and the tracking coils 212 generate magnetic fields, which move the lens 16. The drive section therefore generates much heat while operating.

As shown in FIGS. 3 and 4, the first light source unit 18 is located farther from the drive section than any other component provided in the housing 201. The first light source unit 18 is therefore less influenced than otherwise by the heat the drive section generate. Spaced far from the unit 18, the drive section is not greatly influenced by the heat the unit 18 generates. Both the first light source unit 18 and the drive section can operate with sufficient reliability.

As shown in FIGS. 3 and 4, the beam splitter 13-1 and the collimator lens 14 are secured to the bottom of the housing 201 and aligned in the optical path between objective lens 16 and the first light source unit 18. The second light source unit 28 is secured to a side wall of the housing 210. The prism 15 is located below the objective lens 16.

In operation, the first light source unit 18 emits a laser beam. The beam travels parallel to the bottom of the housing 201 and is applied to the beam splitter 13-1. The beam splitter 13-1 can receive not only the laser beam emitted from the first light source unit 18, but also the laser beam emitted from the second light source unit 28 and having the second wavelength which is relatively long. Both laser beams can be applied to the recording surface of the optical disk (a DVD or a CD) mounted on the disk-driving section 101, through the collimator lens 14, prism 15 and objective lens 16.

How the optical head 200 is moved in the housing 300 of the optical disk apparatus will be explained, with reference to FIG. 5.

As can be understood from FIG. 5, the line connecting the first light source 11 and the beam splitter 13-1 is substantially parallel to the side wall 302 of the housing 300, i.e., one of two side walls which define a corner 301. The line connecting the second light source 21 and the beam splitter 13-1 is substantially perpendicular to the side wall 302. The second light source 21 is located closer to the collimator lens 14 than the focal point of the lens 14.

The optical head 200 can be moved back and forth between the disk-driving section 101 and the corner 301 in the radial direction of the optical disk mounted on the section 101, while opposing the recording surface of the optical disk. As described above, the second light source 21 is at a shorter distance from the collimator lens 14 than the focal point A thereof as is illustrated in FIG. 2B. The optical head 200 therefore has a smaller width W, and the housing 300 of the optical disk apparatus can be smaller, than otherwise. The optical disk apparatus can be made small enough to be portable.

Figure 6A:
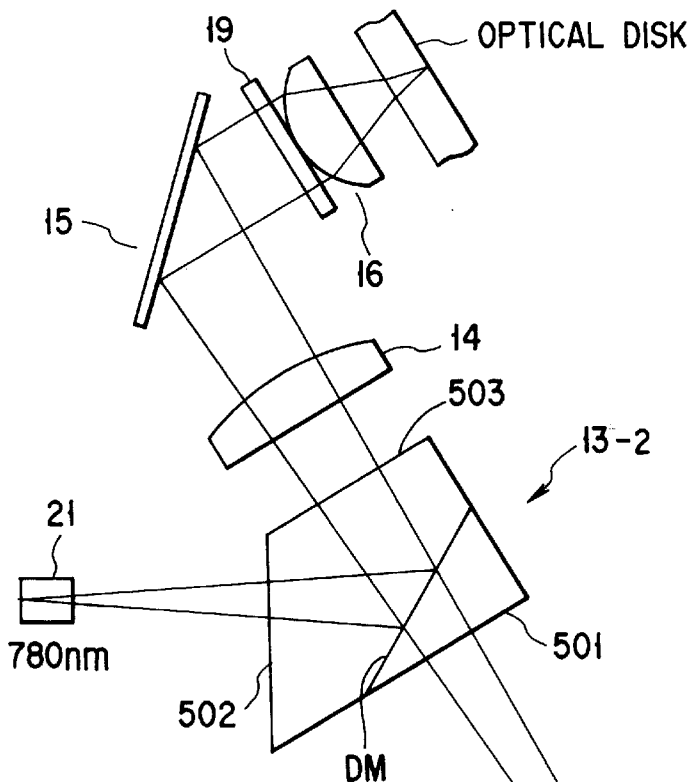
FIG. 6A shows the positional relationship between the components of the optical head.

FIG. 6A shows the components of the optical head 200 and illustrates the beam splitter 13-2 in detail.

As mentioned above, the optical head 200 has two light sources 11 and 21 and two photodetectors 17 and 27. The beam splitter 13-2 guides the beam emitted from the first light source 11 to the recording surface of a DVD, and the beam emitted from the second light source 21 to the recording surface of a CD. The beam splitter 13-2 also guides the beam reflected from the DVD to the first photodetector 17, and the beam reflected from the CD to the second photo detector 27. The beam splitter 13-2 is an optical component which has excellent wavelength characteristic and can therefore efficiently guide the laser beams to the photodetectors 17 and 27.

As FIG. 6A shows, the beam splitter 13-2 has first surface 501, a second surface 502, a third surface 503 and a dichroic mirror DM. The second surface 502 is jointed to the first surface 501 and inclines at 60° thereto. The third surface 503 opposes the first surface 501 and extends parallel thereto. The dichroic mirror DM is provided within the beam splitter 13-2 and located between the surfaces 501 and 502 and opposes the second surface 502. The mirror DM is jointed to the first surface 501 and inclines thereto by an angle of 30°.

The first surface 501 receives the laser beam emitted from the first light source 11. The second surface 502 receives the laser beam emitted from the second light source 21. The dichroic mirror DM allows the passage of the beam applied to the first surface 501, guiding the beam straight to the third surface 503. The mirror D M reflects the beam applied to the second surface 502 and guides the beam to the third surface 503. Namely, the dichroic mirror DM guides both laser beams in the same optical path.

The beam emitted from the first light source 11, applied to the optical disk and reflected therefrom is guided back to the first surface 501 of the beam splitter 13-2 and applied to the first photodetector 17 which is located beside the first light source 11. On the other hand, the beam emitted from the second light source 12, applied to the optical disk and reflected therefrom is guided back to the second surface 502 of the beam splitter 13-2 and applied to the second photodetector 27 which is positioned beside the second light source 21. In other words, the beam splitter 13-2 guide the laser beams reflected from the optical disk in different directions.

Figure 6B:
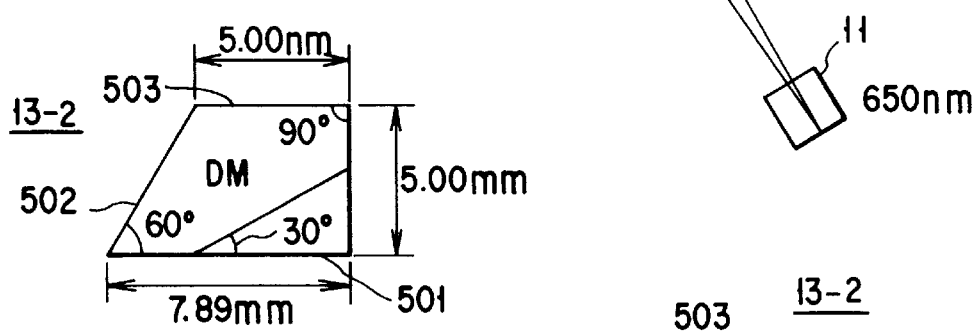
FIGS. 6B and 6C are a side view and a perspective view of the beam splitter incorporated in the optical head.
Figure 6C:
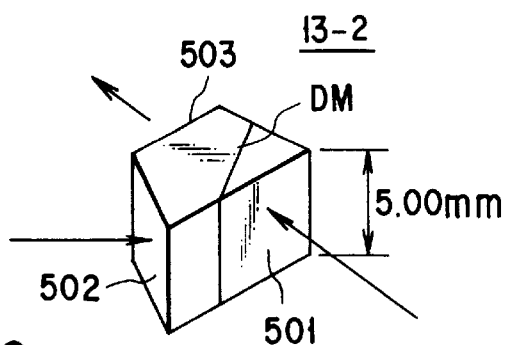

The beam splitter 13-2 has the dimensions specified in FIG. 6B. The directions in which the laser beams emitted from the light sources 11 and 21 are applied to the beam splitter 13-2 and applied therefrom are shown in FIG. 6C.

As indicated above, the laser beam emitted from the second light source 21 is reflected at the dichroic mirror DM and thereby guided in the same optical path as the laser beam emitted from the first light source 11. In view of this, the angle at which the mirror DM faces to the laser beam emitted from the light source 21, is of vital importance.

Figure 7A:
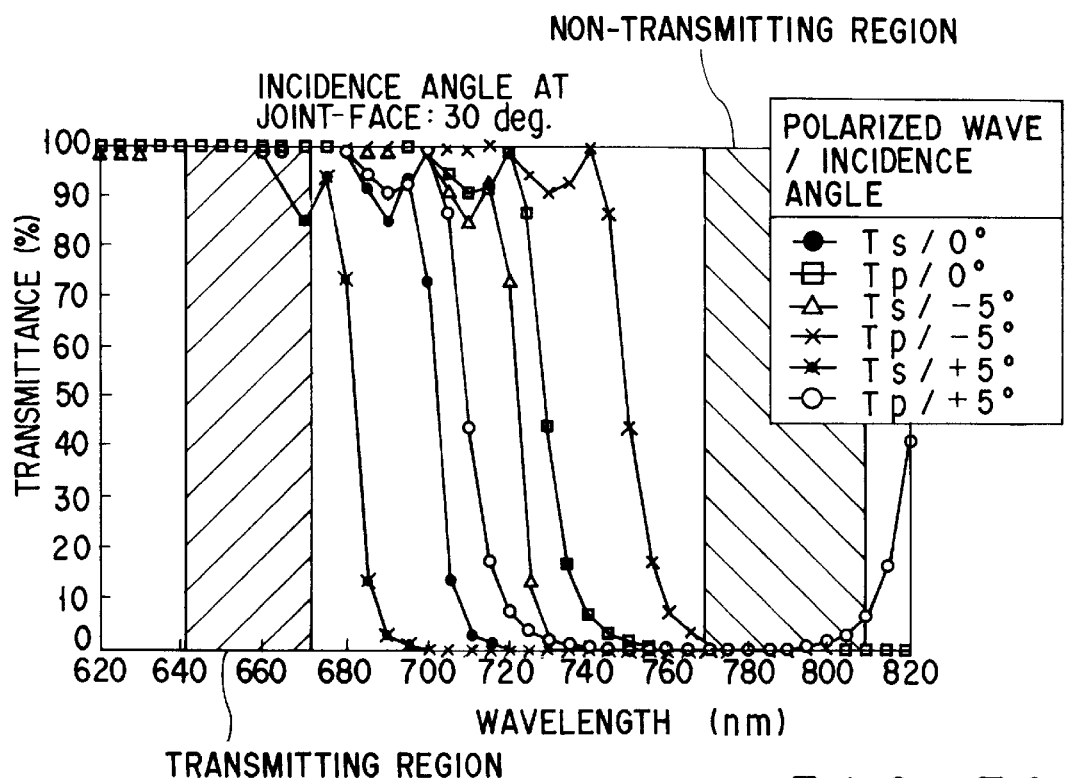
FIG. 7A is a graph representing the wavelength characteristic of the beam splitter which has a dichroic mirror DM having a joint-face incidence angle of 30°.

FIG. 7A represents the wavelength characteristic of the beam splitter which has the dichroic mirror DM having a joint-face incidence angle of about 30°. The term "joint-face incidence angle" means the angle formed by a beam applied to the dichroic mirror DM and the perpendicular thereto at the point the beam is applied.

Figure 7B:
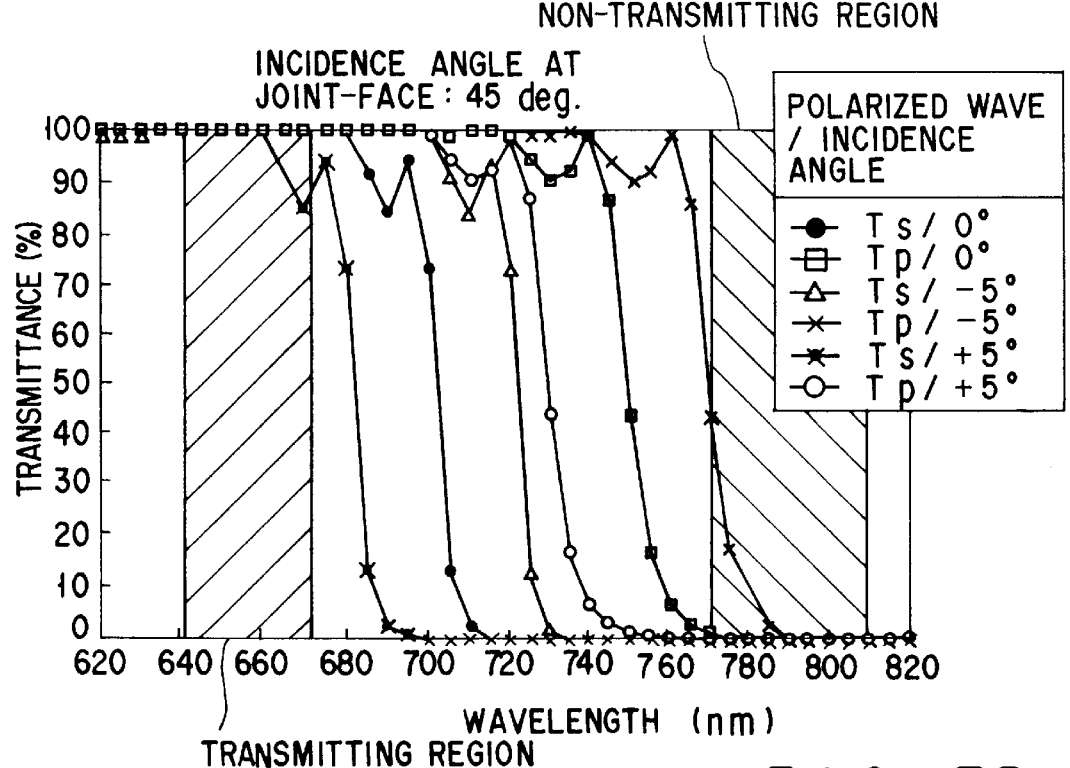
FIG. 7B is a graph showing the wavelength characteristic of a beam splitter which has a dichroic mirror DM having a joint-face incidence angle of 45°.

FIG. 7B shows the wavelength characteristic of a beam splitter which has the dichroic mirror DM having a joint-face incidence angle of 45°.

A dichroic mirror is designed on the basis of the wavelengths of light beams which may be applied to it. It allows the passage of light beams whose wavelengths fall within one or more ranges and reflects light beams whose wavelengths fall in any other ranges. To apply a light beam having an optimal wavelength to a DVD and a light beam having an optimal wavelength to a CD, as is required in this invention, a dichroic mirror must be designed to pass one light beam and reflect the other light beam.

The beam splitter 13-1 has a dichroic mirror DM. This dichroic mirror DM is designed to pass light beams having wavelengths ranging from 635 nm to 670 nm and to reflect light beams having wavelengths ranging from 770 nm to 810 nm. Both wavelength ranges are relatively broad for two reasons. First, the two light sources used may emit light beams which have wavelengths slightly different from the two designed values. Second, the characteristic of the dichroic mirror DM may change due to the characteristic of the transparent members between which the mirror DM is interposed. Both wavelength ranges may be altered in accordance with the changes in the wavelengths of the beams emitted from the light sources and the changes in the characteristic of the mirror DM.

A dichroic mirror is an optical component which allows the passage of light beams having some wavelengths and which reflects light beams having other wavelengths. This wavelength characteristic changes in accordance with the type of the light beam applied to it. That is, a dichroic mirror exhibits a specific characteristic to polarized S waves (hereinafter referred to as "polarized waves Ts") and another characteristic to polarized P waves (hereinafter referred to as "polarized waves Tp"), even if both light beams are applied at the same incidence angle. Furthermore, the wavelength characteristic of a dichroic mirror shifts in accordance with the incidence angle of a light beam. The smaller the change and shift of the wavelength characteristic, the better. A great shift of the characteristic means a low efficiency of using the incident light.

As evident from FIGS. 7A and 7B, the wavelength characteristic of the beam splitter which has a joint-face incidence angle of about 30° shifts with the incidence angle of the laser beam but far less than the wavelength characteristic of the beam splitter which has a joint-face incidence angle of 45°. This means that the beam splitter guides the incident light efficiently.

In FIGS. 7A and 7B, the wavelength of the incident light beam is plotted on the abscissa, while the transmittance of the dichroic mirror is plotted on the ordinate. Either figure shows the characteristics the dichroic mirror exhibits to some polarized waves Ts and Tp applied at incident angles ranging from −5°, 0° and +5°. The laser beam emitted from a light source and applied to either beam splitter is diverging and should therefore be guided in a desired direction. As seen from FIG. 7B, the polarized wave Tp applied at incident angle of −5° to the beam splitter which has a joint-face incidence angle of 45° is pass through the dichroic mirror DM, not reflected thereat. Obviously, the beam splitter having a joint-face incidence angle of 45° uses the laser beam consisting of polarized wave Tp, but with a very low efficiency.

As described above, the beam splitter can use the incident light beam with high efficiency. It therefore works well particularly in an optical disk apparatus which records data by applying a laser beam to an optical disk. If incorporated in an optical disk apparatus which records and reproduces data, the beam splitter will serve to reduce the signal-reading error more than a beam splitter having a joint-face incidence angle of 45° and incorporated in an optical disk apparatus which records a nd reproduces data by using the same power.

The optical disk apparatus according to the invention consumes less power than the apparatus incorporating the beam splitter having a joint-face incidence angle of 45° if both apparatuses have the same signal-reading error rate. This is because the beam splitter uses the incident light beam more efficiently than the beam splitter having a joint-face incidence angle of 45°. Reduction of power consumed is very important to optical disk apparatuses which have many parts made of resin.

The optical disk apparatus and optical head 200, according to the present invention, are advantageous in the following respects.

The first and second light sources 11 and 21 emit laser beams which have different wavelengths and which are to be applied to two types of optical disks, respectively. The beams are applied in different directions, intersecting with each other at an anble other than 90°. The beam splitter is located at the intersection of the beams and guides the beams in one optical path. The beam splitter helps to apply the beams to the two types of optical disks, respectively, under the best conditions for reading or writting the data. Since the beams emitted from the first and second light sources 11 and 21 intersect with each other at an abgle other than 90°, the optical head 200 can be made narrow in the radial direction of the optical disk, rendering the optical disk apparatus smaller.

As shown in FIG. 6A, the collimator lens 14 faces the third surface 503 of the beam splitter 13-2, the first light source 11 is located at the focal point of the collimator lens 14, and the second light source 21 is at a shorter distance from the collimator lens 14 than the focal point thereof. The distortions of the first and second beam spots caused by spherical aberration, when the objective lens 16 is moved to achieve focusing control, can be reduced. Then the excellent beam spot can be obtained. Further, the length of the optical path of the laser beam emitted from the second light source 21 is shortened because the light source 21 is located at a shorter distance from the collimator lens 14 than the focal point A thereof.

As shown in FIG. 5, the laser beam passing through the collimator lens 14 inclines at 45° to the line in which the objective lens 16 is moved to achieve tracking control. Since the beam inclines to this line, the head 200 must be at least as long as the optical path of the beam. Nonetheless, the optical head 200 can be relatively small since it extends parallel to one side of the housing 300 of the optical disk apparatus.

The laser beam passing through the collimator lens 14 and the laser beam emitted from the first light source 11 aligned with each other, and the optical path of the beam emitted from the first light source 11 is longer than that of the beam emitted from the second light source 21. The optical path of the beam emitted from the first light source 11 is straight, while the optical path of the beam emitted from the second light source 21 is bent. This serves also to minimize the width W of the optical head 200.

The first light source 11 which generates more heat than the second light source 21 is provided on the optical axis of the collimator lens 14 and at one end of the optical head 200, i.e., the focal point of the collimator lens. Namely, the first light source 11 is farther from the section for driving the objective lens 16 than any other components. Therefore, the heat the first light source 11 can be radiated efficiently.

The beam splitter is positioned near the center of gravity of the optical head 200. In other words, the beam splitter is mounted near the center after the other optical components are arranged in the case. The optical head 200 can therefore be moved more stably and smoothly than otherwise.

Having the advantages described above, the optical head 200 can applies two optimal laser beams to two optical disks of different types, respectively. Since the light sources 11 and 21 are so positioned as to emit laser beams which intersect with each other at an angle other than 90°, at the dichroic mirror DM of the beam splitter, the optical head 200 has a relatively small width W as is illustrated in FIG. 5. Having a small width, the optical head 200 helps miniaturize the optical disk apparatus.

As mentioned above, the beam splitter 13-2 has three surfaces 501, 502 and 503 and a dichroic mirror DM. The laser beam emitted from the first light source 11 passes through the first surface 501, the dichroic mirror DM and the third surface 503. The beam emitted from the second light source 21 passes through the second surface 502, reflected at the dichroic mirror DM and passes through the third surface 503. The first surface 501 and the second surface 502 are adjacent and incline to each other. The first surface 501 and the third surface 503 are parallel to each other. As indicated above, the dichroic mirror DM exits within the beam splitter 13-2. Thus, the beam splitter 13-2 is an optical component which can guide two laser beams of different wavelengths (e.g., 650 nm and 780 nm) to two optical disks of different types. Furthermore, it serves to render the optical head 200 small, despite the fact that the head 200 has two light sources 11 and 21.

Four modifications of the beam splitter will be described with reference to FIGS. 8A to 8D. Like the beam splitter 13-2, the modified beam splitter have a joint-face incidence angle of about 30°.

The beam splitter 13-3 shown in FIG. 8A is characterized in two respects. First, the first and second surfaces 501 and 502 are in the same plane. Second, the beam splitter 13-3 has a fourth surface 504 which is adjacent and inclined to the third surface 503. The beam emitted from the second light source 21 applied to the second surface 502 is reflected at the fourth surface 504 and guided to the dichroic mirror DM. If the beam splitter 13-3 is used, the second light source 21 can be located near the first light source 11.

The beam splitter 13-4 shown in FIG. 8B is characterized in two respects. First, the second surface 502 extends at right angles to the first surface 501. Second, a prism 511 contacts the second surface 502. The laser beam emitted from the second light source 21 applied to that surface of the prism 511 which is flush with the first surface 501. The beam is reflected at the inclined surface of the prism 511 and applied to the second surface 502. It passes through the second surface 502 and guided to the dichroic mirror DM. If the beam splitter 13-4 is used, the second light source 21 can be located near the first light source 11, as in the case where the beam splitter 13-3 is employed.

The beam splitter 13-1 shown in FIG. 8C has a prism 512, like the beam splitter 13-4 (FIG. 8B). The beam splitter 13-5 shown in FIG. 8D has no prism but is identical in shape and function to the beam splitter 13-1 (FIG. 8C).

Figure 9:
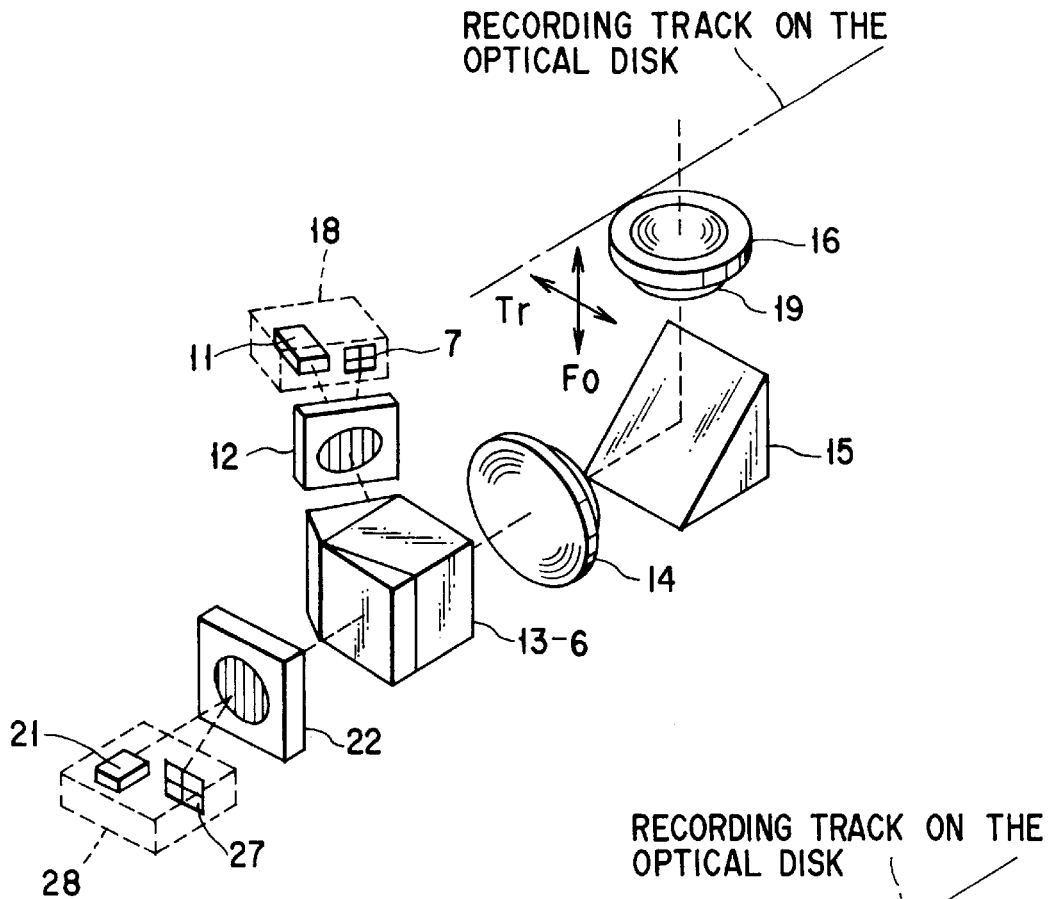
FIG. 9 is a perspective view of an optical head of the second type according to the present invention.

FIG. 9 shows an optical head of the second type according to the present invention. This optical head is identical in structure to the optical head 200 (FIG. 1), except that the positions of the light sources 11 and 21 are exchanged.

Figure 10:
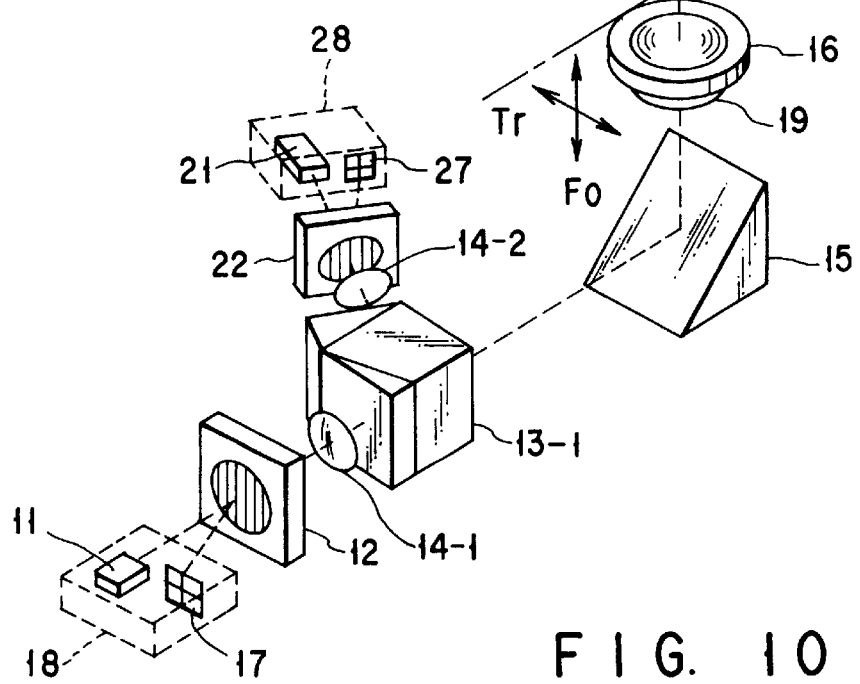
FIG. 10 is a perspective view of an optical head of the third type according to the invention.

FIG. 10 shows an optical head of the third type according to the present invention. This optical head is identical in structure to the optical head 200 (FIG. 1), except that two collimator lens 14-1 and 14-2 are used in place of the collimator lens 14. As shown in FIG. 10, no collimator lens is provided between the beam splitter 13-1 and the prism 15. The first collimator lens 14-1 is located between the first light source 11 and the beam splitter 13-1, and the second collimator lens 14-2 between the second light source 21 and the beam splitter 13-1. The optical head of the third type performs the same function as the optical head 100 shown in FIG. 1 and the optical head of the second type shown in FIG. 9).

The dichroic filter 19 will be described in detail, with reference to FIGS. 11A to 11D.

With the present invention it is possible to reduce the deformation of the beam spot on an optical disk which occurs while the objective lens 16 and the dichroic filter 19 are moved together to accomplish focusing control or tracking control, or both. Hence, the optical head 200 can minimize the signal-reading error and can therefore be sufficiently reliable.

FIG. 11A is a plan view of the dichroic filter 19. The filter 19 is made of glass such as BK7 and is a flat square plate having a size of 4 mm×4 mm and a thickness of 0.3 mm. The filter 19 has a central, circular phase-matching region 19a and a dichroic-film region 19b surrounding the region 19a.

The phase-matching region 19a has a transmittance of 97% or more to light having a wavelength of 770 nm to 810 nm and also to light having a wavelength of 640 nm to 670 nm. By contrast, the dichroic-film region 19b has a transmittance of 10% or less to light having a wavelength of 770 nm to 810 nm and a transmittance of 97% or more to light having a wavelength of 640 nm to 670 nm.

The dichroic filter 19 exhibits the transmission characteristic shown in FIG. 11B to light which has a wavelength ranging from 770 nm to 810 nm. It exhibits the transmission characteristic shown in FIG. 11C to light which has a wavelength ranging from 640 nm to 670 nm.

The numerical aperture of the dichroic filter 19 can be switched from one to the other, in accordance with which light source is used, the first light source 11 or the second light source 21. When the first light source 11 is used, a laser beam having a wavelength of 650 nm is applied to the dichroic filter 19, and the numerical aperture of the filter 19 increases. This is because both the phase-matching region 19a and the dichroic-film region 19b have a transmittance of 97% or more to light which has a wavelength of 640 nm to 670 nm. On the other hand, when the second light source 21 is used, a laser beam having a wavelength of 780 nm is applied to the dichroic filter 19, and the numerical aperture of the filter 19 decreases because the dichroic-film region 19b have a transmittance of only 10% or less to light having a wavelength of 770 nm to 810 nm.

The dichroic-film region 19b may be circular like the phase-matching region 19a and concentric with the region 19a, surround ing the phase-matching region 19a. Whether rectangular as shown in FIG. 11A or circular like the region 19a, the dichroic-film region 19b defines a large numerical aperture and a small numerical aperture to the laser beams emitted from the first and second light sources 11 and 22, respectively.

The phase-matching region 19a of the dichroic 19 performs three functions. The first function is to allow the passage of a light beam having a wavelength of 770 nm to 810 nm and also a light beam having a wavelength of 640 nm to 670 nm. The second function is to allow the passage of the light having a wavelength of 640 nm to 670 nm in the same amount of the light which passes through the dichroic-film region 19b.

The third function is to suppress the deformation of the beam spot on either type of an optical disk when the filter 19 is moved during the focusing control or tracking control, or both, whereby the signal-reading error be minimized to render the optical head 200 sufficiently reliable.

To perform these functions, the phase-matching region 19a allows the passage of the laser beam emitted from the second light source 21 and having the wavelength of 780 nm. The region 19a is elliptical and has a numerical aperture (NA) of 0.43 along a tangent to the recording track of the optical disk mounted on the disk-driving section 101 and a numerical aperture of 0.4 along the radius of the optical disk.

FIG. 11D shows how the wave-front aberration varies with the distance the dichroic filter 19 having numerical apertures of 0.43 and 0.4 is moved together with the objective lens 16, and also how the wave-front aberration changes with the distance a dichroic filter which has a circular phase-matching region having a numerical aperture of 0.45 is moved. As evident from FIG. 11D, the dichroic filter 19 whose phase-matching region 19a is elliptical causes a smaller wave-front aberration. Thus, the filter 19 reduces the deformation of the beam spot as it is moved along with the objective lens 16 during the focusing control or tracking control, or both.

Figure 12A:
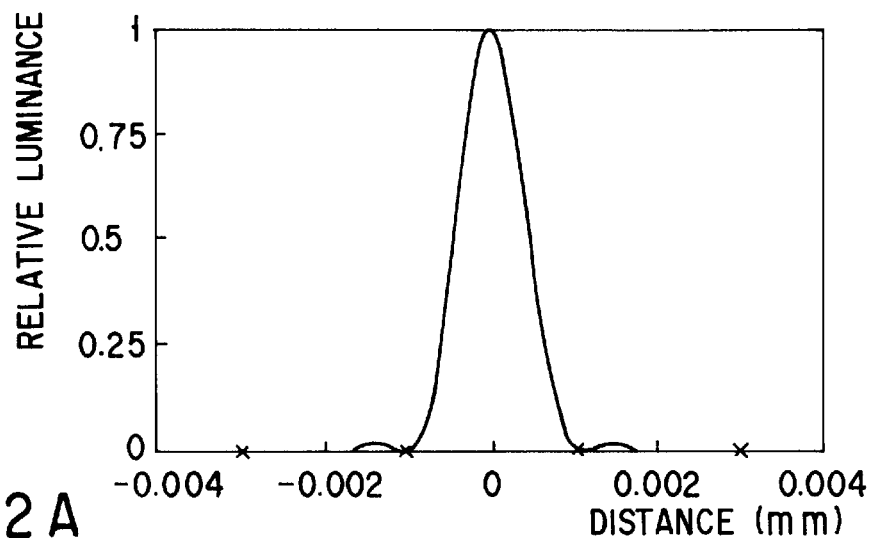
FIG. 12A is a graph illustrating the luminance distribution which a beam spot formed of a laser beam passing through a dichroic filter having a circular phase-matching region exhibits when an objective lens is not shifted.
Figure 12B:
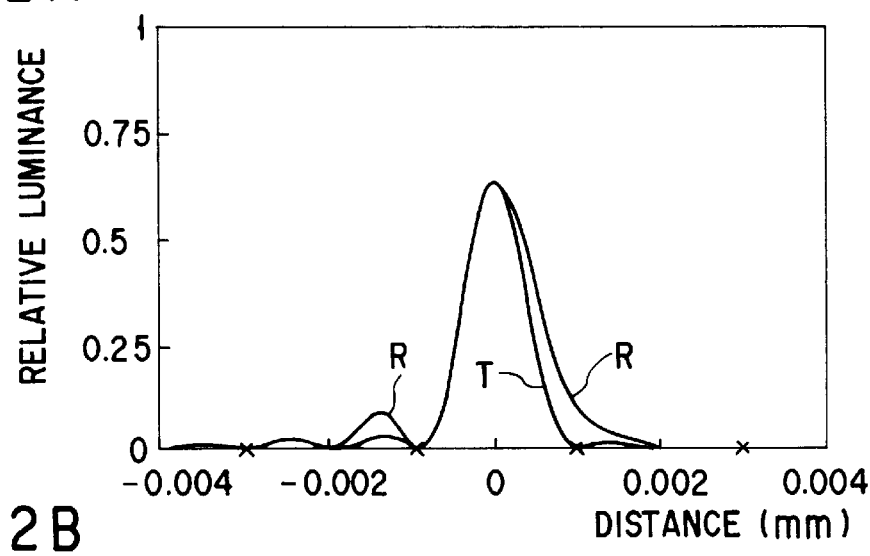
FIG. 12B is a graph illustrating the luminance distribution which a beam spot formed of a laser beam passing through the same dichroic filter exhibits when an objective lens is shifted.
Figure 12C:
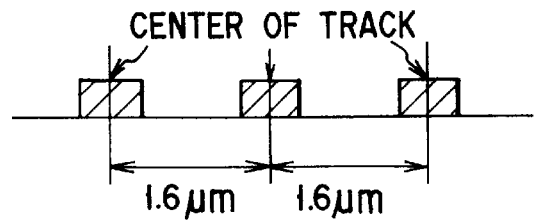
FIG. 12C is a schematic sectional view of the optical disk on which the beam spot is formed.

FIG. 12A shows how the luminance of a beam spot formed of a beam applied through a dichroic filter having a circular phase-matching region (NA=0.45) is distributed when the optical disk is not tilted and the objective lens 16 is not shifted in the radial direction of the disk. FIG. 12B shows how the luminance of a beam spot formed of a laser beam applied through the same dichroic filter is distributed when the optical disk is tilted and the objective lens 16 is moved by 0.4 mm in the radial direction of the disk to achieve tracking control. In FIG. 12B, curve T represents the luminance distribution along the tangent to the recording track, and curve R the luminance distribution along the radius of the disk. FIG. 12C is a schematic sectional view of the optical disk.

Similarly, FIG. 13A shows how the luminance of a beam spot formed of a laser beam applied through the dichroic filter 19 having an elliptical phase-matching region (Nas= 0.43 and 0.4) is distributed when the optical disk is not tilted and the objective lens 16 is not shifted in the radial direction of the disk. FIG. 13B shows how the luminance of a beam spot formed of a laser beam applied through the dichroic filter 19 is distributed when the optical disk is tilted and the objective lens 16 is moved by 0.4 mm in the radial direction of the disk to achieve tracking control. In FIGS. 13A and 13B, curve T represents the luminance distribution along the tangent to the recording track, and curve R the luminance distribution along the radius of the disk. FIG. 13C is a schematic sectional view of the optical disk.

As the comparison between FIG. 12B and FIG. 13B clearly reveals, the luminance of the beam spot formed of the laser beam applied through the dichroic filter 19 having an elliptical phase-matching region decreases much less than that of the beam spot formed of the laser beam applied through the dichroic filter which has a circular phase-matching region. Namely, the dichroic filter 19 causes but a small wave-front aberration and therefore minimizes the deformation of the beam spot which is formed when it is moved along with the objective lens 16 is moved to achieve the focusing control or tracking control, or both.

A method of manufacturing the dichroic filter 19 will be explained, with reference to FIGS. 14A to 14I.

Figure 14A:
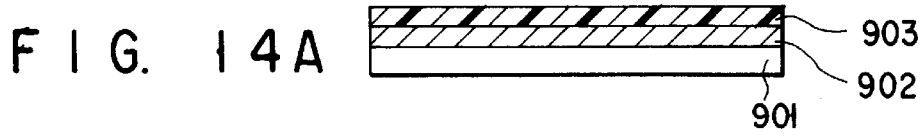
FIGS. 14A to 14I are cross-sectional views for explaining a method of manufacturing the dichroic filter.
Figure 14B:
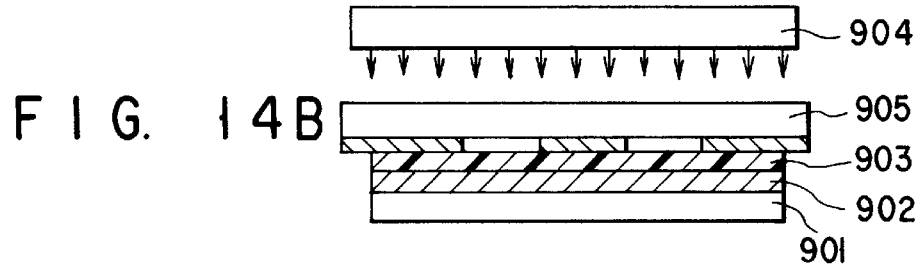
Figure 14C:
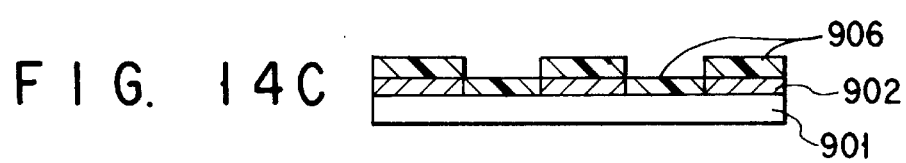
Figure 14D:
Figure 14E:
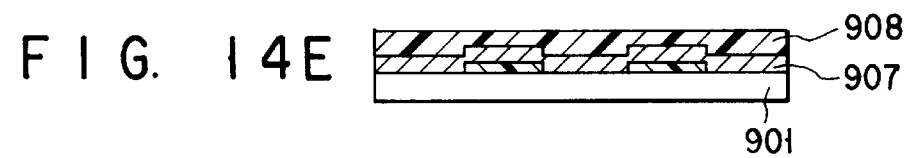
Figure 14F:
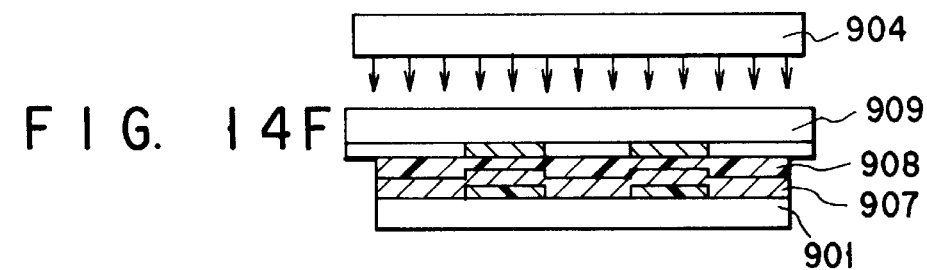
Figure 14G:
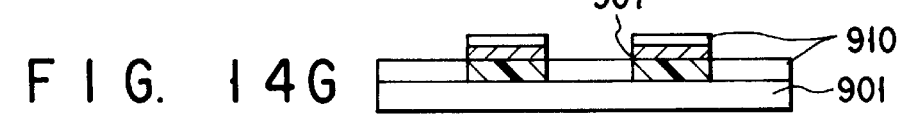
Figure 14H:
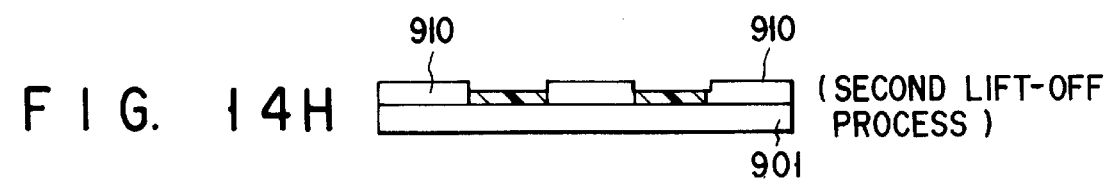
Figure 14I:

As shown in FIG. 14A, a metal film 902 is vapor-deposited on the upper surface of a glass substrate 901, and a resist 903 is coated on the metal film 902 (Step 1). A light-exposure device 904 applies light to the resist 903 through a mask 905, the resist 903 is patterned, and that part of the metal film 902 which is exposed through the patterned resist is etched away, as is illustrated in FIG. 14B (Step 2). The patterned resist 903 is removed, and a dichroic film 906 is vapor-deposited on the remaining part of the metal film 902 and on the exposed part of the glass substrate 901, as is shown in FIG. 14C (Step 3). As shown in FIG. 14D, the remaining part of the metal film 902 and the dichroic film provided thereon are removed by means of lift-off process (Step 4). As shown in FIG. 14E, a metal film 907 is vapor-deposited on the upper surface of the structure shown in FIG. 14D, and a resist 908 is coated on this metal film 907 (Step 5). Next, the light-exposure device 904 applies light to the resist 908 through a mask 909 as shown in FIG. 14F, the resist 908 is patterned, and that part of the metal film 907 which is exposed through the patterned resist is etched away (Step 6). As shown in FIG. 14G, a phase-matching film 910 is vapor-deposited on the upper surface of the resultant structure (Step 7). Lift-off technique is performed, placing the phase-matching film 910 in the same plane as the dichroic film 906 as shown in FIG. 14H (Step 8). Finally, as shown in FIG. 14I, the structure of FIG. 14H is cut by dicing into a plurality of dichroic filters (Step 9).

The phase-matching film 910 constitutes the phase-matching region 19a of the dichroic filter 19 and allows the passage of the light having a wavelength of 640 nm to 670 nm in the same amount of the light which passes through the dichroic film 906. The dichroic film 906 constitutes the dichroic-film region 19b of the dichroic filter 19.

In the method of manufacturing the dichroic filter 19, light exposure must be conducted twice. It is difficult to place the second mask at exactly the same position the first mask has assumed. Furthermore, the method has a relatively large number of steps due to the necessity of carrying out light exposure two times.

The method described with reference to FIGS. 14A to 14I may be replaced by a method in which light exposure needs to be performed only once and which therefore comprises a fewer steps. This alternative method will be explained with reference to FIGS. 15A to 15F.

Figure 15A:
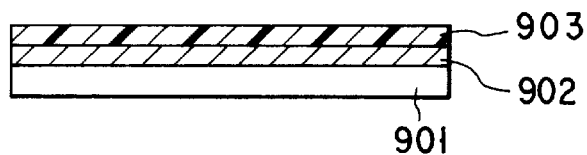
FIGS. 15A to 15F are cross-sectional views for explaining another method of manufacturing the dichroic filter.
Figure 15B:
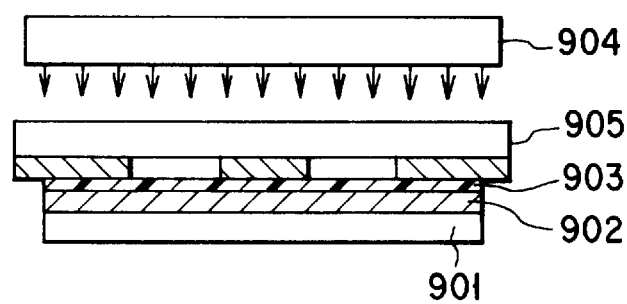

First, as shown in FIG. 15A, a metal film 902 is vapor-deposited on the upper surface of a glass substrate 901, and a resist 903 is coated one metal film 902 (Step 1). A light-exposure device 904 applies light to the resist 903 through a mask 905, the resist 903 is patterned, and that part of the metal film 902 which is exposed through the patterned resist is etched away, as is illustrated in FIG. 15B (Step 2).

Figure 15C:
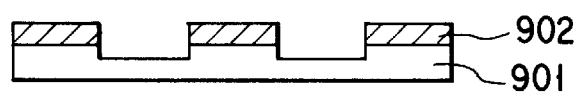
Figure 15D:
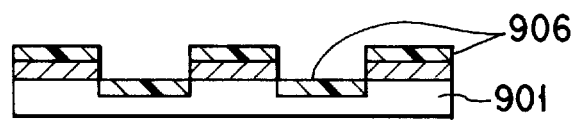
Figure 15E:
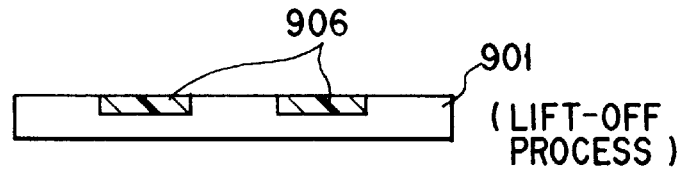
Figure 15F:
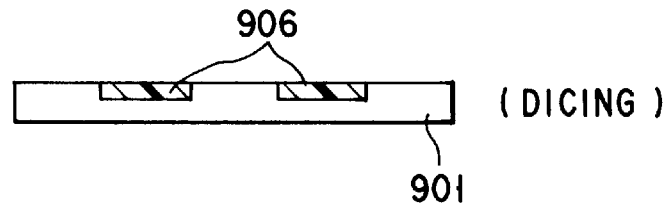

The part of the metal film 902 on which a dichroic film will be formed is etched away, and that surface region of the substrate 901 on which the dichroic film will be formed is also etched away, as is illustrated in FIG. 15C (Step 3). As a result, the substrate 901 has a thinner part. Then, as shown in FIG. 15D, a dichroic film 906 is vapor-deposited on the upper surface of the structure of FIG. 15C (Step 4). The metal film 902 and that part of the dichroic film 906 which are formed on the metal film 902 are removed as is illustrated in FIG. 15E (Step 5). At last, as shown in FIG. 15F, the structure of FIG. 15E is cut by dicing into a plurality of dichroic filters (Step 6).

In the dichroic filter made by the method explained with reference to FIGS. 15A to 15F, phase-matching is accomplished by the thick part of the glass substrate 901. More specifically, the reduction in the amount of light in the dichroic film 906 is compensated by the thick part of the substrate 901 on which no dichroic film is provided. The dichroic filter 19 can therefore exhibit the transmission characteristic shown in FIG. 11C to light having a wavelength of 640 nm to 670 nm.

Light exposure is conducted only once in the method explained with reference to FIGS. 15A to 15F. The dichroic film 906 can be positioned more accurately and can have be shaped with higher precisions than the dichroic film formed in the method which has been described with reference to FIGS. 14A to 14I.

The dichroic filter 19 is connected to the objective lens 16 and moves as the lens 16 is moved to carry out focusing control and tracking control. Alternatively, the filter 19 may be formed integral with the objective lens 16. In this case, the lens 16 made of glass serves as the substrate 901.

FIGS. 16A and 16B are a sectional view and a plan view of a dichroic filter 20 which function as an objective lens, as well. As FIG. 16B shows, the filter 20 comprises a phase-matching region a1 and a dichroic-film region a2 surrounding the region a1. The region a1 allows the passage of the laser beams emitted from the light sources 11 and 21 and having a wavelength of 650 nm and a wavelength of 780 nm. The region a2 allows the passage of the laser beam having the wavelength of 650 nm and reflects the laser beam having the wavelength of 780 nm. It should be noted that the 650 nm beam is applied to a DVD, and the 780 nm beam is applied to a CD. The phase-matching region a1 is elliptical; it has a numerical aperture (NA) of 0.43 along a tangent to the recording track of the optical disk mounted on the disk-driving section 101 and a numerical aperture of 0.4 along the radius of the optical disk. The dichroic filter 20 minimizes the deformation of the beam spot which is formed when it is moved to achieve the focusing control or tracking control, or both.

Above the dichroic filter 20 will reduces the number of optical components of the optical head 200. Further, the filter 20 will ultimately render the head 200 smaller and decrease the manufacturing cost of the optical disk apparatus. In addition, the objective lens unit can be moved with a smaller force than the objective lens 16 and the dichroic filter 19 are moved together, because the filter 20 is combined with the objective lens.

In the present invention, the objective lens 16 and the dichroic filter 19, or the dichroic filter 20 is driven by a lens-driving mechanism.

The mechanism will be described, with reference to FIGS. 17A, 17B and 17C.

Figure 17A:
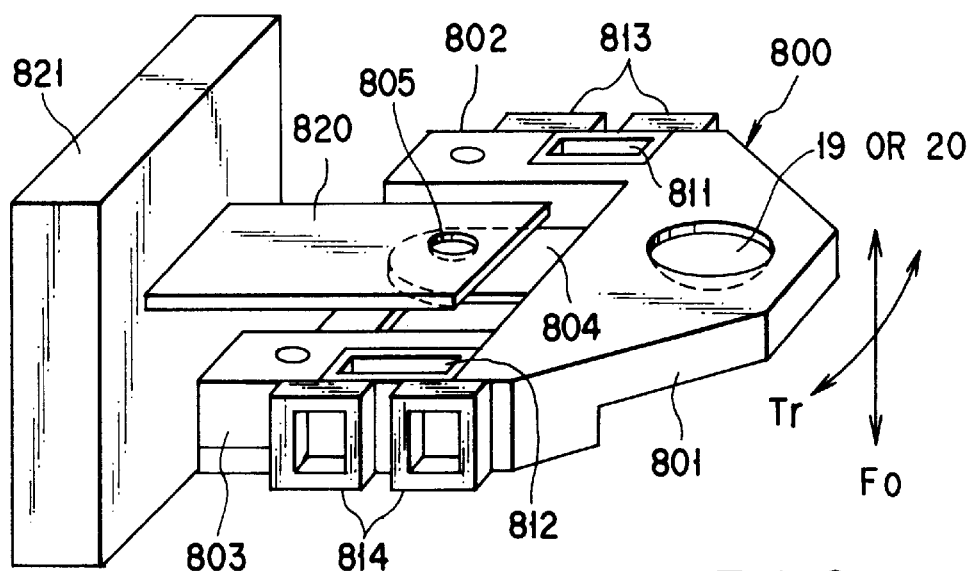
FIG. 17A is a perspective view of the mechanism incorporated in the optical head, for driving the objective lens.
Figure 17B:
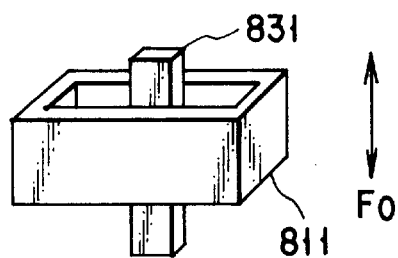
FIGS. 17B and 17C are perspective views showing some parts of the mechanism illustrated in FIG. 17A.
Figure 17C:
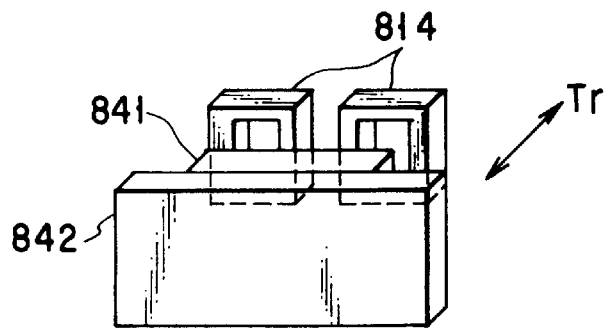

As shown in FIG. 17A, the lens-driving mechanism comprises a lens holder 800, two legs 802 and 803, a support 804, a shaft 805, a leaf spring 820, and a spring holder 821. The lens holder 800 has a head 801 which holds either the objective lens 16 or the dichroic filter 20. Both legs 802 and 803 are formed integral with the head 801 of the lens holder 800. The support 804 is also formed integral with the head 801 and located between the legs 802 and 803. The distal end of the support 804 is connected by the shaft 805 to the distal end of the leaf spring 820. The spring 820 is fastened at its proximal end to the spring holder 821. The holder 821 is secured to a base (not shown), standing upright therefrom. The support 804 can be rotated around the shaft 805 in the direction of arrow Tr to achieve tracking control. When the leaf spring 820 is deformed, the head 801 moves in the direction of arrow Fo to accomplish focusing control.

The lens-driving mechanism comprises further comprises two focusing coils 811 and 812, a pair of tracking coils 813, a pair of tracking coils 814, and two yokes 831.

The focusing coils 811 and 812 are fitted in the grooves cut in the legs 802 and 803, respectively. The coils 811 and 812 are positioned with their axes extending in the direction (the arrow Fo) in which to move the objective lens 16 or the dichroic filter 20 to perform focusing control. As shown in FIG. 17B, the first yoke 831 extends through the first focusing coil 811 and is secured to the base (not shown), standing upright therefrom. Similarly, the second yoke 831 extends through the second focusing coil 812 and is secured to the base, standing upright therefrom. When an electric current flows through the first focusing coil 811, the coil 811 generates a magnetic force, which moves the head 801 in one direction along the arrow Fo.

As seen from FIG. 17A, the tracking coils 813 are attached to the outer side of the first leg 802, and the tracking coils 814 to the outer side of the second leg 803. The tracking coils 813 and 814 are positioned, each with its axis extending in the direction (the arrow Tr) in which to move the objective lens 16 or the dichroic filter 20 to perform tracking control. As shown in FIG. 17C, the tracking coils 814 are secured to a magnet 841, which is formed integral with a yoke 842. Similarly, the tracking coils 813 are secured to a magnet (not shown), which is formed integral with a yoke (not shown). When an electric current flows through the tracking coils 813 and 814, the coils 813 and 814, generate a magnetic force, which moves the head 801 in one direction along the arrow Tr.

As described above, the present invention can provide an optical head which has two light sources, switched from one to the other by electric means in accordance with the type of an optical disk. The optical head is resistant to vibration, excels in durability, and can be miniaturized. Furthermore, the optical head is easy to maintain and operates reliably.

The present invention can provide an optical disk apparatus which incorporates a small optical head of the type described above and which can therefore be miniaturized.

Further, the present invention can provide an optical component which has such wavelength characteristic as to guide efficiently beams emitted from two light sources to an optical disk and to guide the beams reflected from the optical disk to two photodetectors in two different optical paths, respectively.

Still further, the present invention can provide a dichroic filter which can suppress the deformation of a beam spot which occurs as an objective lens is moved to achieve focusing control and tracking control, in order to reduce the signal-reading error.

Furthermore, the invention can provide a method of manufacturing a dichroic filter in a few steps and with high precision.

Moreover, the present invention can provide a dichroic filter which has an objective lens, and which excels in optical characteristics, and which helps to reduce the number of optical components constituting an optical head, to minimize the number of steps of assembling the optical head, to miniaturize the optical head and to lower the manufacturing cost thereof.

The optical path along which a laser beam is applied to the mirror 15 has not been described in conjunction with the direction in which the optical head is moved to achieve tracking control. This optical path may extend at about 90° to the radial direction of the optical disk in which the optical head is moved. If so, the beam spot will move on the mirror 15 in parallel to the surface of the optical disk when the objective lens 16 moves to accomplish the tracking control. Hence, the mirror 15 can be located near the surface of the optical disk, because the optical head can be made thin as a whole.

Other embodiments of the present invention will be described with reference to the accompanying drawings.

FIG. 18 shows an optical head of the fourth type according to the invention. As shown in FIG. 18, the optical head comprises a first light source 11, a first focusing-error detector 12, a prism-shaped beam splitter 13-7, two collimator lens 14-1 and 14-2, a prism 15, an objective lens 16, a first focusing-error detector 17, a dichroic filter 19, a second light source 21, a second focusing-error detector 22, and a second photodetector 27. The prism 15 may be replaced by a mirror. The prism 15 may be replaced by a mirror.

The first light source 11 is a semiconductor laser which emits a laser beam having a wavelength of, for example, 650 nm. The second light source 21 is a semiconductor laser which emits a laser beam having a wavelength of, for example, 780 nm. The beam emitted from the first light source 11 is applied through the first focusing-error detector 12 to the first collimator lens 14-1. The first collimator lens 14-1 adjusts the diversion of the laser beam. The laser beam thus adjusted is then applied to the beam splitter 13-7. The beam splitter 13-7 guides the beam to the prism 15. The laser beam emitted from the second light source 21 is applied through the second focusing-error detector 22 to the second second collimator lens 14-2. The second collimator lens 14-2 adjusts the diversion of the beam. The laser beam thus adjusted is applied to the beam splitter 13-7. The beam splitter 13-7 allows this beam to travel straight to the prism 15.

The first focusing-error detector 12 diffracts the beam applied from the beam splitter 13-7 through the first collimator lens 14-1 and guides the beam to the first photodetector 17. The second focusing-error detector 22 diffracts the beam applied from the beam splitter 13-7 through the second collimator lens 14-2 and guides the beam to the second photodetector 27. The beam splitter 13-7 guides the beam (650 nm) reflected by the prism 15 to the first light source 11. It also guides the beam (780 nm) reflected by the prism 15 to the second light source 21.

The laser beam supplied from the beam splitter, whichever wavelength (650 nm or 780 nm) it has, is reflected by the prism 15. The beam thus reflected is applied to an optical disk (not shown) through the dichroic filter 19 and objective lens 16, forming a beam spot on the recording surface of the optical disk. The beam reflected from the optical disk passes through the objective lens 16 and dichroic filter 19. The prism 15 reflects this beam to the beam splitter 13-7. The beam splitter 13-7 guides the beam to the first focusing-error detector 12 through the first collimator lens 14-1 if the beam is one whose wavelength is 650 nm. The beam splitter 13-7 guides the beam to the second focusing-error detector 22 through the second collimator lens 14-2 if the beam is one whose wavelength is 780 nm. The focusing-error detectors 12 and 22 achieve hologram diffraction, each guiding the input light beam straight or diffracting by an angle in accordance with the direction in which the light beam is polarized.

As seen from FIG. 18, the first light source 11 and the first photodetector 17 constitute a first light source unit 18, while the second light source 21 and the second photodetector 27 constitute a light source second unit 28. This helps render the optical head small.

The dichroic filter 19 is located very close to the objective lens 16 or connected to the lens 16. The filter 19 has a variable numerical aperture. When the numerical aperture is set at the minimum value, the optical head can read data from a CD. When the numerical aperture is set at the maximum value, the optical head can read data from a DVD. The objective lens 16 and the dichroic filter 19 can be moved together in two directions Fo and Tr to achieve focusing control and tracking control. To be more specific, the lens 16 and the filter 19 are moved in the directions Fo and Tr as the servo circuit (not shown) supplies control signals to the focusing control coil (not shown) and the tracking control coil (not shown, either).

Various design measures are taken to make the optical head (FIG. 18) be as small as possible.

Figure 19A:
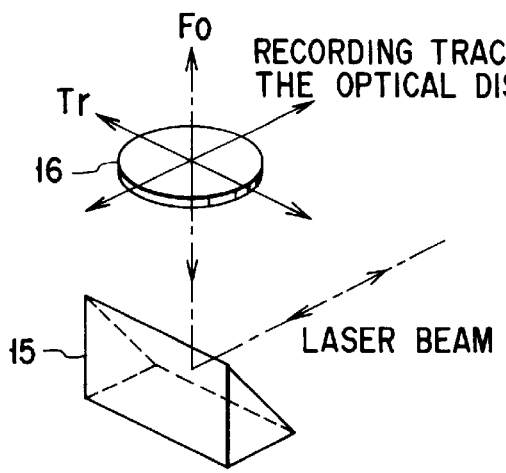
FIGS. 19A, 19B and 19C are diagrams explaining the operation and advantage of the optical head of the fourth type according to the invention.
Figure 20A:
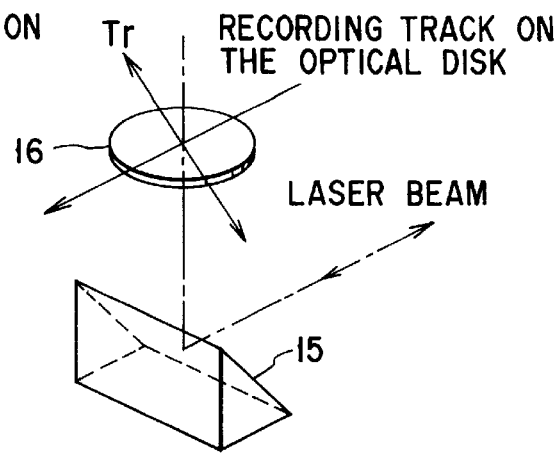
FIGS. 20A, 20B and 20C are diagrams explaining the operation and disadvantage of an optical head different to the optical head of the fourth type.
Figure 19B:
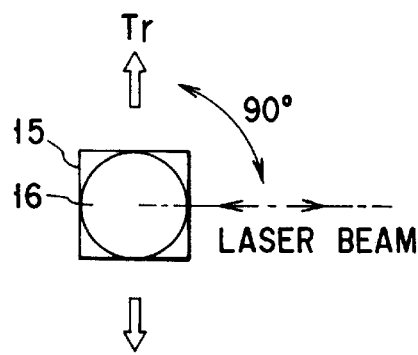
Figure 20B:
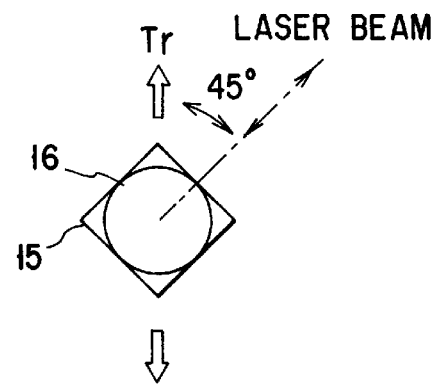
Figure 19C:
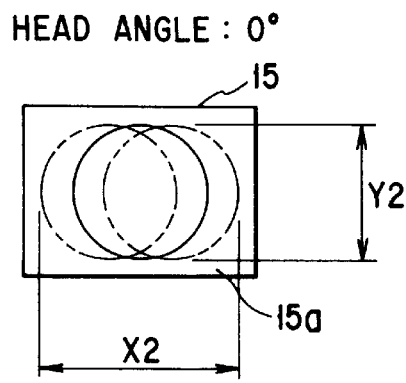
Figure 20C:
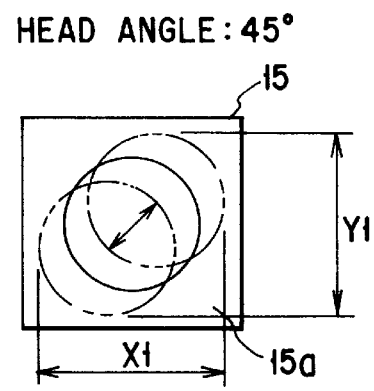

First, the laser beam applied to the prism 15 located below the objective lens 16 extends at an angle of about 90° to the direction Tr as shown in FIGS. 19A and 19B. This angle corresponds to a so-called head-swing angle of 0°. Thanks to the head-swing angle of 0°, the beam spot on the beam-reflecting surface 15a of the prism 15 moves in a horizontal direction as shown in FIG. 19C when the objective lens 16 is moved in the direction Tr to achieve tracking control. Thus, the beam-reflecting surface 15a is efficiently utilized. The height Y2 of the prism 15 can therefore be reduced, making it possible to render the optical head thinner than otherwise. If the head-swing angle were 45° (not 0°) as shown in FIGS. 20A and 20B, the beam spot on the beam-reflecting surface 15a of the prism 15 would move in a diagonal direction as shown in FIG. 20C and the prism 15 should have a greater height Y1 than height Y2 as is shown in FIG. 20C, making it impossible to render the optical head thin.

Figure 21:
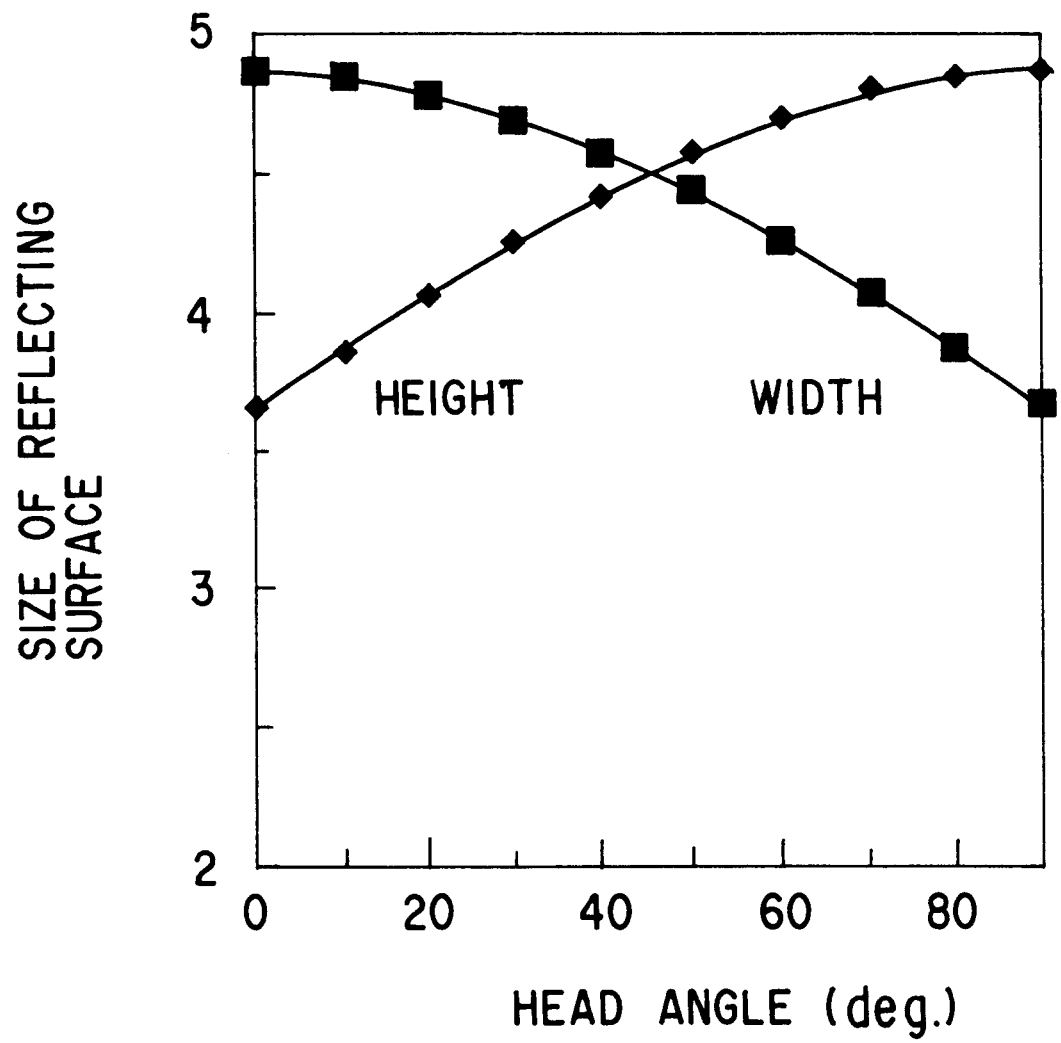
FIG. 21 is a graph representing the relationship which the head-swing angle has with the size of the reflecting surface of the prism in the optical head of the fourth type.

FIG. 21 represents the relationship between the head-swing angle and the the size of the reflecting surface 15a of the prism 15. As seen from FIG. 21, the surface 15a has a minimum height and a maximum aspect ratio when the head-swing angle is 0°.

As shown in FIGS. 2A and 2B, the diverging beam emitted from the first light source 11 passes through the first collimator lens 14-1 and the beam splitter 13-7, is reflected by the prism 15, is applied through the objective lens 16 to a DVD (not shown), forming a beam spot on the recording surface of the DVD. On the other hand, the diverging beam emitted from the second light source 21 passes through the second collimator lens 14-2 and the beam splitter 13-7, is reflected by the prism 15, is applied through the objective lens 16 to a CD (not shown). The second light source 21 is located closer to the beam split ter 13-7 than the focal point of the second collimator lens 14-2 so that the beam emitted form the second light source 21 and applied through the lenses 14-2 and 16 may form a spot of a desired shape on the recording surface of the CD. This also serves to reduce the size of the optical head.

The first collimator lens 14-1 converts the laser beam emitted from the first light source 11 to a parallel beam as is illustrated in FIG. 2A. The objective lens 16 focuses the parallel beam, which forms a small beam spot on the recording surface of the thin single-recording substrate of the DVD. The beam supplied from the second collimator lens 14-2 is slightly diverging, not a completely parallel beam, as shown in FIG. 2B. This is because the second light source 21 is located closer to the beam splitter 13-7 than the focal point of the second collimator lens 14-2. When focused by the objective lens 16, the slightly diverging beam converges at a point farther from the lens 16 than the point where the beam supplied from the first collimator lens 14-1 converges. The converging beam supplied from the lens 16 is applied to a CD, forming a spot on the recording surface of the relatively thick signal-recording substrate of a CD. The spherical aberration is improved in spite of the object lens 16 is designed so that suitable to the first light source.

As mentioned above, the second light source 21 is located closer to the beam splitter 13-7 than the focal point of the second collimator lens 14-2. This helps not only to reduce the size of the optical head, but also to increase the efficiency of using light on a CD. The optical head is therefore suitable also for use in optical disk apparatuses which record data on an optical disk.

FIG. 22A shows an optical disk apparatus which incorporates an optical head 200 of the fourth type.

As described in conjunction with FIG. 7, a dichroic mirror is designed on the basis of the wavelengths of light beams which may be applied to it; it allows the passage of light beams whose wavelengths fall within one or more ranges and reflects light beams whose wavelengths fall in any other ranges. The beam splitter 13-7 shown in FIG. 22A has a dichroic mirror DM. This dichroic mirror DM is designed to pass light beams having wavelengths of 770 nm to 810 nm and to reflect light beams having wavelengths of 635 nm to 670 nm. The mirror DM has characteristic opposite to that of the dichroic mirror DM of the beam splitter 13-1 shown in FIG. 1. In the beam splitter 13-7, a light beam having a wavelength ranging from 635 nm to 670 nm is applied to the dichroic mirror DM at a joint-face incidence angle of about 30°. Hence, the dichroic mirror DM reflects this light beam as is desired. The smaller the joint-face incidence angle, the more reliably the mirror DM reflects the light beam. The light beam having a wavelength ranging from 635 nm to 670 nm may therefore be applied to the mirror DM at a joint-face incidence angle less than 30°. As shown in FIG. 22A, the optical disk apparatus comprises a disk-driving section 101, two arms 202 and 204, and two guide rails 203 and 205, in addition to the optical head 200. A DVD and a CD which differ in thickness can be mounted on the disk-driving sec-tion 101, one at time. The optical head 200 applies a laser beam to the recording surface of the optical disk (a DVD or a CD) mounted on the section 101. The arms 202 and 204 are formed integral with two opposite sides of the housing 201 of the head 200, respectively. The guide rails 203 and 205 are provided outside the housing 201 of the head 200 and extend parallel to each other. The arms 202 and 204 are slidably mounted on the guide rails 203 and 205, respectively. The guide rails 203 and 205 support the optical head 200 at a level above the recording surface of the optical disk mounted on the disk-driving section 101. The optical head 200 can therefore be moved in two opposite directions W1 and W2, along the radius of the optical disk.

The first light source unit 18 for applying a laser beam of the first wavelength to a DVD is secured to the bottom of the housing 201. An optical base surrounds the first light source unit 18 to radiate heat from the unit 18 efficiently. This is important, because the unit 18 generates much heat while operated by a large current and emitting a laser beam of the first wavelength which is relatively short.

Since the first light source 11 is located very far from the a drive section for driving the objective lens 16. Hence, thermal interference, if any, between the first light source 11 and the drive section is small. As may be understood from FIG. 22A, the head housing 201 remains unseen as viewed from above the optical disk, even when the objective lens 16 is positioned at the outermost recording track of the disk. That is, the line connecting the lens 16 and the unit 18 extend along one side of the disk-driving section 101, and the unit 18 is located at a longer distance from the lens 16 than any other component of the optical head 200.

The objective lens 16 is moved to achieve tracking control and focusing control by means of the drive section. The drive section is provided in the housing 201. The drive section has a tracking coil, a focusing coil, and an actuator, which cooperate to move the lens 16 to accomplish tracking control and focusing control. When supplied with control currents, the focusing coil and the tracking coil generate magnetic fields, which move the lens 16. The drive section therefore generates much heat while operating. The first light source unit 18 is located farther from the drive section than any other component provided in the housing 201 and is less influenced than otherwise by the heat the drive section generate. Spaced far from the unit 18, the drive section is not influenced so much by the heat the unit 18 generates. Both the first light source unit 18 and the drive section can operate with sufficient reliability.

The first light source unit 18 is provided closer to the disk-driving section 101 than the second light source unit 28. The unit 18 therefore receives the wind which the disk-driving section 101 generates while operating. The unit 18 is cooled with this wind.

In operation, the first light source unit 18 emits a laser beam as shown in FIG. 22A. The beam travels parallel to the bottom of the housing 201 and passes through the first collimator lens 14-1. It is applied to the beam splitter 13-7 secured to the bottom of the housing 201. The beam splitter 13-7 can receive not only the beam emitted from the first light source unit 18, but also the beam having a longer waveform, which is emitted from the second light source unit 28 and which passes through the second collimator lens 14-2. Both laser beams can be applied through the prism 15 and the lens 16 to the recording surface of the optical disk (a DVD or a CD) mounted on the disk-driving section 101.

How the optical head 200 is moved in the housing 300 of the optical disk apparatus will be explained, with reference to FIG. 22A.

As can be understood from FIG. 22A, the optical head 200 is located to move along the line connecting the disk-driving section 101 and the corner 301 of the housing 300. The optical head 200 can therefore be moved back and forth between the disk-driving section 101 and the corner 301 of the housing 300 in the radial direction of the optical disk, while opposing the recording surface of the optical disk. As described above and as shown in FIG. 2B, the second light source 21 is at a shorter distance from the collimator lens 14 than the focal point A thereof. The housing 300 of the optical disk apparatus can be smaller than than otherwise. This serves to render the optical disk apparatus small enough to be portable.

FIG. 22B illustrates the beam splitter 13-8 in detail.

As mentioned above, the optical head 200 has two light sources 11 and 21 and two photodetectors 17 and 27. The beam splitter 13 guides the beam to the recording surface of a DVD or a CD. The beam splitter 13 also guides the beam reflected from the DVD or the CD to the photo detector. The beam splitter 13-8 is an optical component which has excellent wavelength characteristic and can therefore efficiently guide the laser beams to the photodetector.

As FIG. 22B shows, the beam splitter 13-8 has first surface 501, a second surface 502, a third surface 503 and a dichroic mirror DM. The first surface 501 receives the laser beam emitted from the first light source 11. The second surface 502 receives the laser beam emitted from the second light source 21. From the third surface 503 a laser beam is supplied to the prism 15. The third surface 503 totally reflects the beam from the first light source 11. The dichroic mirror DM totally reflects the beam emitted from the first light source 11 and allows the passage of the beam emitted from the second light source 21.

The objective lens 16 is shifted from its neutral position to accomplish tracking control. Thus, the beam applied to the prism 15 must have a large diameter r1 so as to be applied to the objective lens 16, no matter how much the objective lens 16 is shifted. The beam applied from the third surface 503 of the beam splitter 13-8 has a sufficient diameter. Its diameter r1 is greater than the diameter r2 of the laser beam applied to the first surface 501. This is because first surface 501 is inclined to the laser beam emitted from the first light source 11 and the beam splitter 13-8 therefore has the function of shaping a beam. It follows that the collimator lens 14-1 can be small, which contributes to the miniaturization of the optical head 200.

According to the above beam splitter, the beam emitted from the first light source 11 and intersecting with the light beam emitted from the second light source 21 is applied to the dichroic mirror DM at a joint-face incidence angle of less than 45°. The dichroic mirror DM totally reflects the beam and guide the same along the same optical path as the laser beam emitted from the second light source 21. Thanks to the dichroic mirror DM, the first light source unit 18 need not be provided in a line parallel to the laser beam emitted from the second light source 21. This helps to reduce the size of the head 200 to the size of a CD jacket.

As described above, the beam splitter 13-8 has the first surface 501 to which the laser beam emitted from the first light source unit 18 is applied slantwise, and the second surface 502 which opposes the surface 503 for totally reflecting the light beam applied to the first surface 501 and which receives the beam emitted from the second light source unit 21 and having a longer wavelength than the beam emitted from the first light source unit 18. The dichroic mirror DM is provided between the second and third surfaces 502 and 503. The mirror DM inclines at 30° to the second surface 502. This angle will be hereinafter referred to as "joint-face incidence angle." The dichroic mirror DM totally reflects the beam emitted from the first light source 11 and allows the passage of the beam emitted from the second light source 21.

The beam splitter 13-8 receives the laser beam reflected from a DVD at the third surface 503 and supplies it from the first surface 501, and receives the laser beam reflected from a CD at the third surface 503 and supplies it from the second surface 502. That is, the beam splitter 13 applies a laser beam to the first photodetector 17 during the use of the first light source 11, and applies a laser beam to the second photodetector 27 during the use of the second light source 21.

In FIG. 22C the third surface 503 of the beam splitter 13-7 is inclined at a specific angle and totally reflects the laser beam emitted from the first light source 11. The beam splitter 13-7 is composed of two triangular prisms of different sizes. The prism receiving the beam emitted from the second light source 21 is smaller. Hence, the second light source 21 and the optical parts associated with the source 21 (i.e., second collimator lens 14-2, second focusing-error detector 22 and second photodetector 27) can be located close to the beam splitter 13-7. This helps to miniaturize the optical head 200.

The dichroic mirror DM reflects the beam emitted from the first light source 11, whereby the beam supplied from the third surface 503 is guided in the same direction as the beam emitted from the second light source 21 travels through the beam splitter 13-7 and is supplied to the third surface 503. The joint-face incidence angle is important.

FIG. 7A represents the characteristic of the beam splitter having the dichroic mirror DM which has a joint-face indidence angle of 30°. FIG. 7B represents the characteristic of a beam splitter which has a dichroic mirror DM having a joint-face incidence angle of 45°. As is evident from FIGS. 7A and 7B, the smaller the joint-face incidence angle, the more the color separation characteristic is improved. Color separation characteristic can be improved if the joint-face incidence angle is 30° or less.

The optical head shown in FIG. 18 and the optical disk apparatus shown in FIG. 22A incorporating this optical head have the following advantages.

The first and second light sources 11 and 21 emit laser beams which have different wavelengths and which are to be applied to two types of optical disks, respectively. The beams are applied in different directions, intersecting with each other at an angle other than 90°. The beam splitter is located at the intersection of the beams and guides the beams in one optical path. The beam splitter guides the beams to the two types of optical disks, respectively, under optimal conditions. Since the beams emitted from the first and second light sources 11 and 21 intersect with each other, the optical head can be made narrow in the radial direction of the optical disk, rendering the optical disk apparatus smaller.

Since the head-swing angle of 0°, the prism 15 has a small height. This serves to render the optical disk apparatus thin.

The beam splitter is positioned near the center of gravity of the optical head. In other words, the beam splitter is mounted on the center after the other optical components are arranged in the case. The optical head can be moved more stably and smoothly than otherwise.

Having the advantages described above, the optical head can applies two optimal laser beams to two optical disks of different types, respectively. The light sources 11 and 21 are positioned as described above. The optical disk apparatus can therefore be made small as a whole. Since the beam splitter guides the beam emitted from the first light source 11 and having a wavelength of, e.g., 650 nm, in the same optical path as it guides the beam emitted from the second light source 21 and having a wavelength of, e.g., 780 nm, the optical head can be miniaturized.

Other optical disk apparatuses according to the present invention will be described, with reference to FIGS. 23A to 23C, FIGS. 24A and 24B and FIGS. 25A and 25B. These apparatuses each have a beam splitter which has a joint-face incidence angle of 30°. The components similar or identical to those of the optical disk apparatuses described above are designated at the same reference numerals in FIGS. 23A to 23C, FIGS. 24A and 24B and FIGS. 25A and 25B and will not be described in detail.

Figures 23A, 23B, 23C:
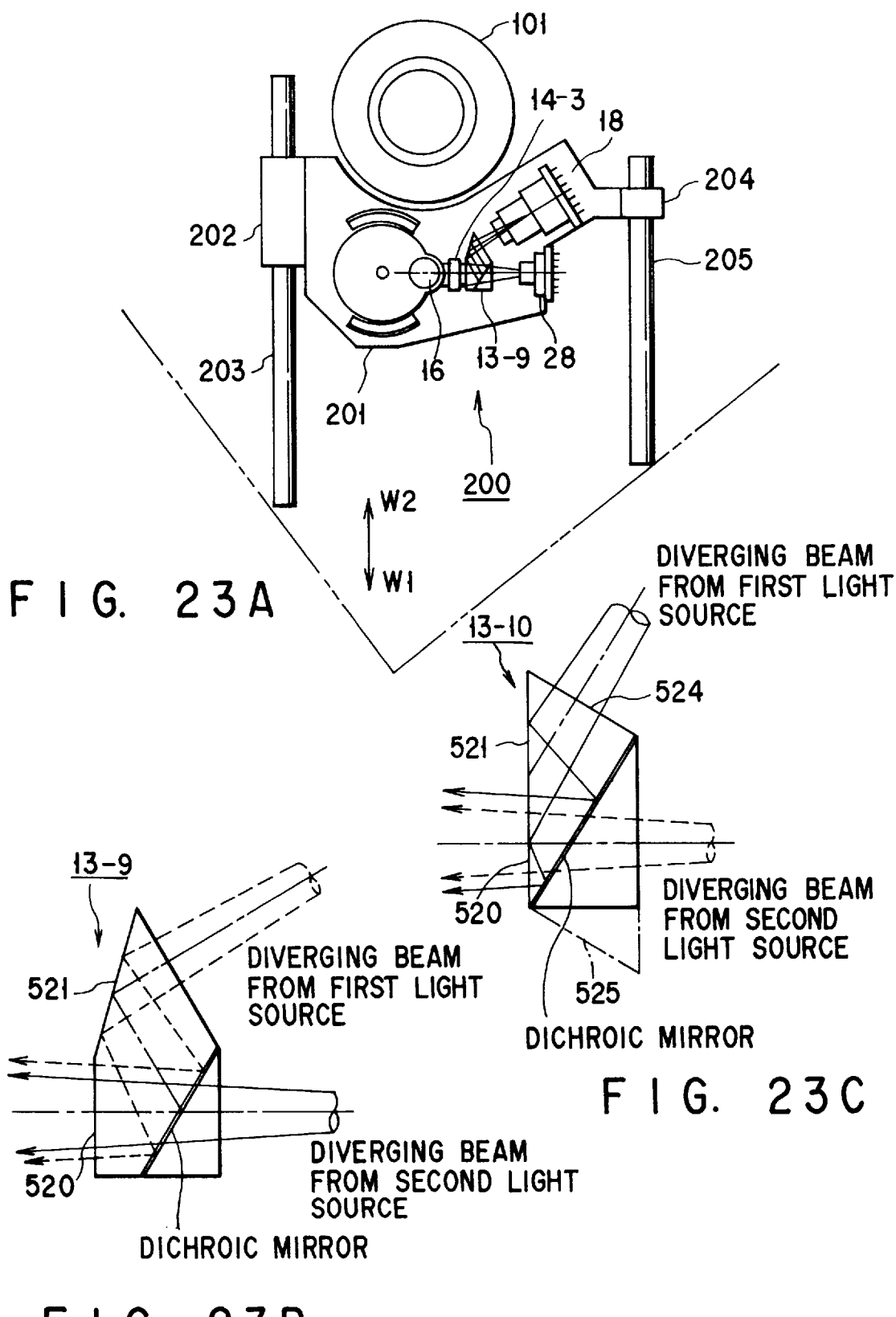
FIG. 23A is a plan view of an optical disk apparatus which incorporates an optical head of the fifth type according to the invention.
FIG. 23B is a plan view of the beam splitter used in the optical head of the fifth type.
FIG. 23C is a plan view of a beam splitter which may be used in place of the beam splitter shown in FIG. 23B.

The optical disk apparatus shown in FIG. 23A incorporates an optical head 200. The optical head 200 has a beam splitter 13-9 and an objective lens 16. The beam splitter 13-9 has the structure shown in FIG. 23B. The beam splitter 13-9 may be replaced by a beam splitter 13-10 illustrated in FIG. 23C. The optical head 200 has one collimator lens 14-3, not two collimator lens as in the third and fourth type. The collimator lens 14-3 is provided between the beam splitter 13-9 and the objective lens 16. The lens 14-3 can serve to apply a desired laser beam to either thin signal-recording substrate of a DVD and a desired laser beam to the thick signal-recording substrate of a CD, as has been explained with reference to FIGS. 2A and 2B.

As shown in FIG. 23B, the beam splitter 13-9 has a beam-emitting surface 520 which is perpendicular to the laser beams the beam splitter 13-9 is emitting. The laser beam emitted from the first light source is applied to the dichroic mirror DM at an incidence angle less than 45°. As a result, the wavelength characteristic of the beam splitter 13-9 shifts only a little, not greatly depending upon the incidence angles of polarized light beams applied to the dichroic mirror DM. Thus, the beam splitter 13-9 uses the joint-face incident light efficiently.

In this case the term "joint-face incidence angle" means an angle formed by the first beam applied to the dichroic mirror DM and the perpendicular thereto at the point the beam is applied.

The beam splitter 13-9 has a surface 521 which totally reflects the laser beam emitted from the first light source and guides the beam to the dichroic mirror DM. The mirror DM totally reflects and guides this beam in the same optical path as it guides the beam emitted from the second light source 21. This helps to miniaturize the optical disk apparatus.

The beam splitter 13-10 shown in FIG. 23C is identical to the beam splitter 13-9 (FIG. 23B), except that the surfaces 250 and 251 exist in the same plane. This beam splitter 13-10 can easily be made by bonding two triangular prisms of similar shape. If the two prisms have respectively surfaces 524 and 525 which are parallel to each other, the beam splitter 13-10 can be easily made by cutting a plate composed of glass layers which are laid one upon another.

Figure 24A:
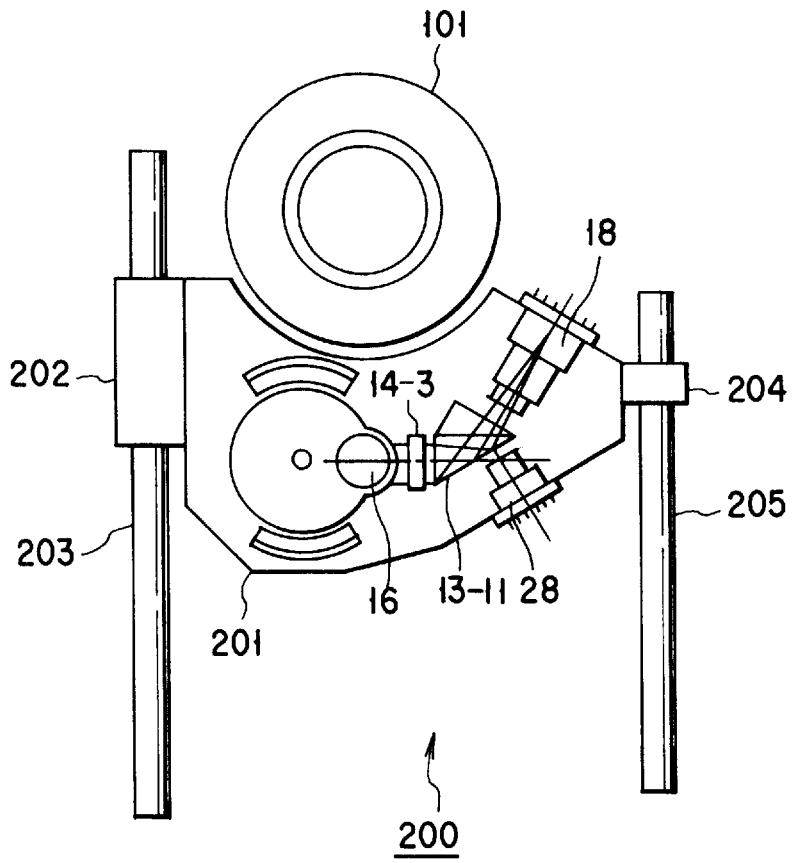
FIG. 24A is a plan view of an optical disk apparatus which incorporates an optical head of the sixth type according to the invention.

The optical disk apparatus shown in FIG. 24A has a beam splitter 13-11, a collimator lens 14-3 and an objective lens 16. The collimator lens 14-3 is located between the beam splitter 13-11 and the objective lens 16. The lens 14-3 can serve to apply a desired laser beam to either thin signal-recording substrate of a DVD and a desired laser beam to the thick signal-recording substrate of a CD, as has been explained with reference to FIGS. 2A and 2B.

Figure 24B:
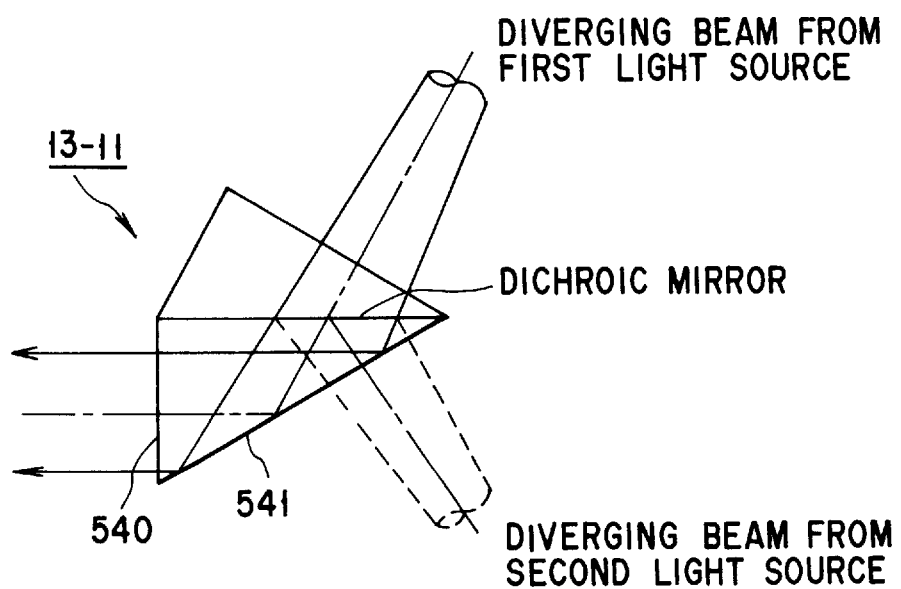
FIG. 24B is a plan view of the beam splitter incorporated in the optical head of the sixth type.

The beam splitter 13-11 has the structure shown in FIG. 24B. The beam splitter 13-11 has a beam-emitting surface 540 which is perpendicular to the laser beams the beam splitter 13-11 is emitting. The beam emitted from the first light source is applied to the dichroic mirror DM at an joint-face incidence angle of less than 45°. Also, the beam emitted from the second light source is applied to the dichroic mirror DM at an the joint-face incidence angle of less than 45°. Hence, the wavelength characteristic of the beam splitter 13-11 shifts only a little, not greatly depending upon the joint-face incidence angles of polarized light beams applied to the dichroic mirror DM. The beam splitter 13D uses the incident light efficiently.

The beam splitter 13-11 has a surface 541 which totally reflects and guides the laser beam emitted from the first light source, in the same optical path as the beam emitted from the second light source 21. This helps to miniaturize the optical disk apparatus.

The beam splitter 13-11 can easily be made by bonding two triangular prisms which have similar shapes and which are located symmetrically with respect to the dichroic mirror DM. In this case, the beam splitter 13-11 can be made by cutting a plate composed of glass layers which are laid one upon another.

Figure 25A:
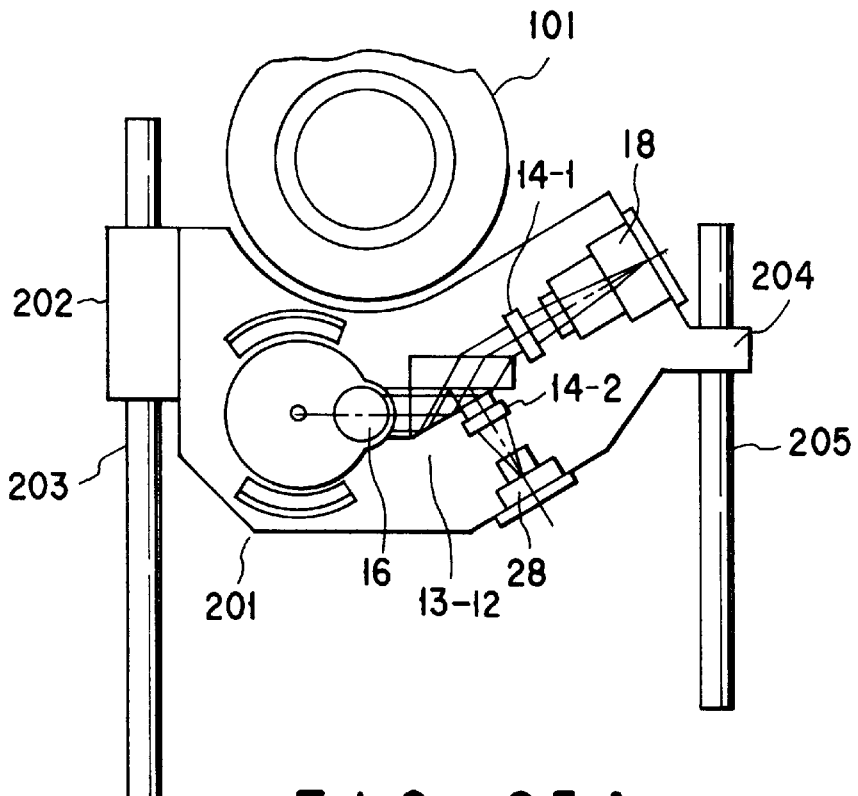
FIG. 25A is a plan view of an optical disk apparatus which incorporates an optical head of the seventh type according to the present invention.

The optical disk apparatus shown in FIG. 25A has a beam splitter 13-12.

Figure 25B:
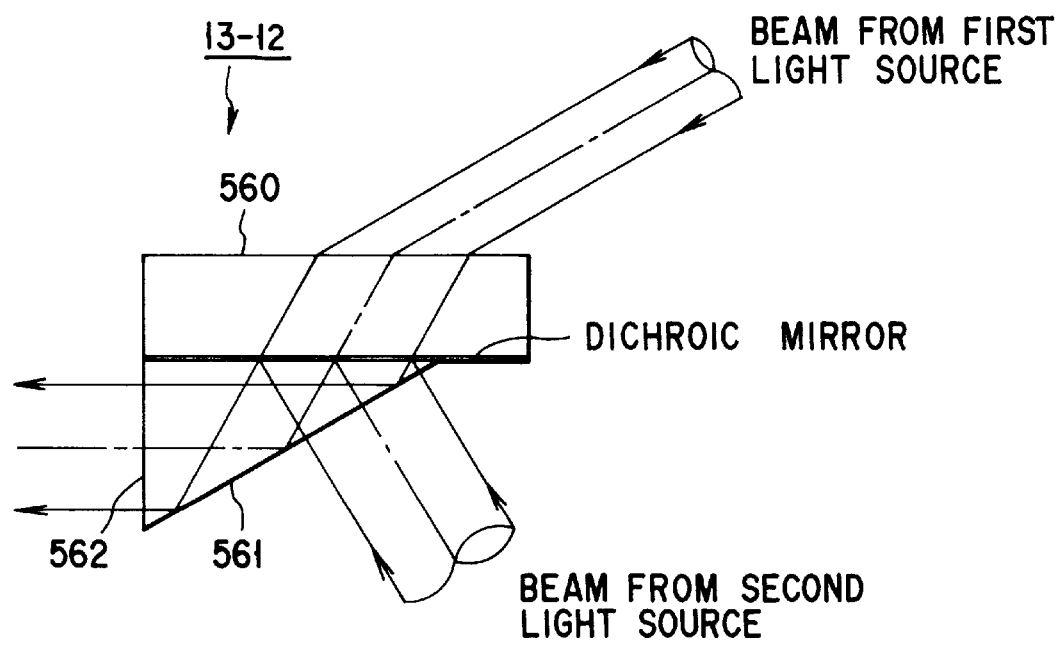
FIG. 25B is a plan view of the beam splitter used in the optical head of the seventh type.

The beam splitter 13-12 has the structure shown in FIG. 25B. The beam splitter 13-12 has a first beam-receiving surface 560 which receives a laser beam emitted from the first light source. The surface 560 has the function of shaping a beam. The beam reflected by the mirror 15 and applied to the lens 16 must have a diameter large enough not to be influenced by the vertical motion of the objective lens 16. Nonetheless, the beam emitted from the first light source need not have so large a diameter, because the beam has its diameter increased as it passes trough the first beam-receiving surface 560 of the beam splitter 13-12. Any optical component provided between the beam splitter 13-12 and the first light source unit 18 can be designed easily. The optical head can therefore be manufactured easily.

The beam splitter 13-12 has a beam-emitting surface 562 which is perpendicular to the beam emitted from the beam splitter 13-12. The beams emitted from the first and second light sources are applied to the dichroic mirror DM at an incidence angle of less than 45°. The wavelength characteristic of the beam splitter 13D therefore shifts only a little, not greatly depending upon the incidence angles of polarized light beams applied to the dichroic mirror DM.

The beam splitter 13-12 utilizes the incident light with high efficiency.

The beam splitter 13-12 has a total reflection surface 561. The surface 561 totally reflects and guides the laser beam emitted from the first light source, in the same optical path as the beam emitted from the second light source 21. This helps to miniaturize the optical disk apparatus.

As seen from FIG. 25B, the beam splitter 13-12 is composed of a glass plate and a triangular prism. Since one component is simple in shape, the beam splitter 13-12 can be manufactured at low cost.

A method of manufacturing a beam splitter composed of two triangular prisms will be described, with reference to FIG. 26.

First, a plurality of glass plates 70a, 70b, 70c, are laid one upon another, thereby forming a rectangular block. Each glass plate has a dichioic film formed on it. The block is the cut along dicing lines indicated by broken lines and dot-dashed lines. As a result, a plurality of parallelopipidic beam splitters are obtained. One of these beam splitters can be sed as the beam splitter 13C shown in FIG. 23C without any modification.

FIG. 27 shows a lens holder 80 holding the objective lens 16 and a mechanism for moving the lens 16 to achieve focusing control and tracking control.

As shown in FIG. 27, the lens holder 80 protrudes from the outer circumferential surface of a disc 81. The disc 81 is supported so as to rotate around its axis and move along its axis. Springs (not shown) hold the disc 81 at an initial position. The disc 81 has two arcuate slits which are symmetrical with respect to the center of the disc 81. Two focusing coils 82a and 82b are fitted in the arcuate slits. Two yokes 83a and 83b are loosely inserted in the focusing coils 82a and 82b and secured to a base (not shown) at their lower ends. Two tracking coils 84a and 84b are attached to the outer circumferential surface of the disc 81, aligned with with the focusing coils 82a and 82b, respectively. Permanent magnets 85a are arranged at regular intervals on the first focusing coil 84a, and permanent magnets 85b are similarly arranged on the second focusing coil 84b.

When focusing control currents flow through the focusing coils 82a and 82b, the disc 81 is moved up or down for short distances so as to accomplish focusing control. When tracking control currents flow through the tracking coils 84a and 84b, the disk 81 is rotated through small angles so as to achieve tracking control.

As described above, this invention can provide an optical head which has two light sources, switched from one to the other by electric means in accordance with the type of an optical disk. The optical head is resistant to vibration, excels in durability, and can be miniaturized. In particular, the optical head can be made thin as a whole.

The present invention is not limited to the optical heads and optical disk apparatuses which have been described above.

As described above, the light source 11 may be located at a longer distance from the lens 14 than the focal point A thereof as illustrated in FIG. 2C, and the second light source 21 may be located at a shorter distance from the lens 14 than the focal point A thereof, but not so short a distance from the lens 14 as in the case illustrated in FIG. 2B. The reason why will be described, with reference to FIGS. 28A to 28D. FIGS. 28A to 28D correspond to FIGS. 2A to 2D, respectively.

Figure 28A:
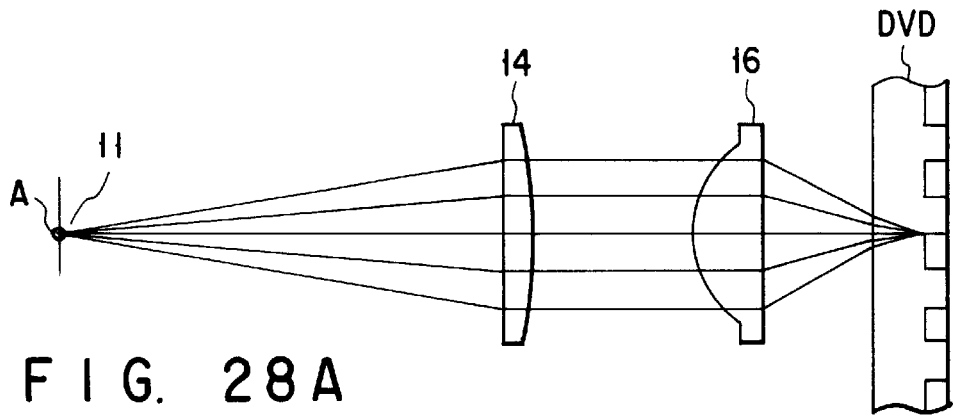
FIGS. 28A to 28D are diagrams presenting various positions the light sources may assume in an optical head according to the present invention.
Figure 28B:
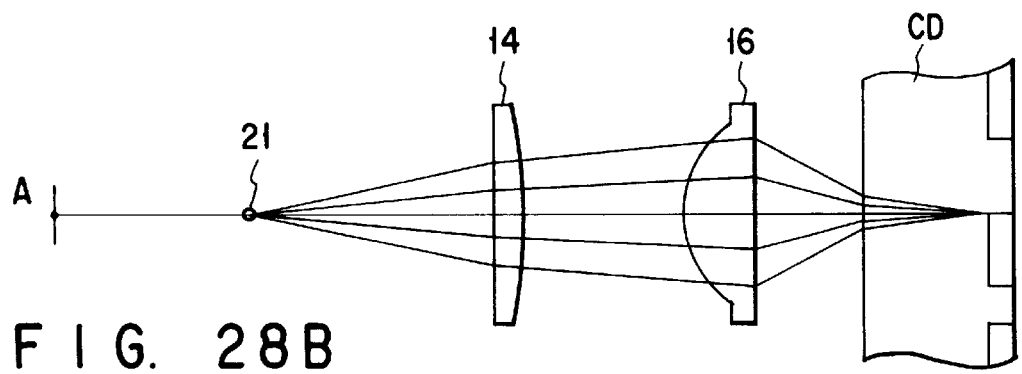

The optical head shown in FIG. 28A is designed to read signals from a DVD in optimal conditions when the first light source 11 is located at the focal point A of the collimator lens 14. The second light source 21 is located as illustrated in FIG. 28B, that is, at a distance shorter from the lens 14 than the focal point A thereof as is shown in FIG. 28B. Since the second light source 21 is so positioned, the collimator lens 14 emits a diverging laser beam. This beam is applied to the CD via the objective lens 16. Its spherical aberration in the thick signal-recording substrate of the CD is compensated. As a result, the laser beam emitted from the second light source 21 is focused on the recording surface of the CD.

However, the optical head cannot record signals from a CD or read signals therefrom with the highest possible efficiency and accuracy if the second light source 21 is located at a relatively long distance from the focal point A of the collimator lens 14 as shown in FIG. 28B.

Figure 29A:
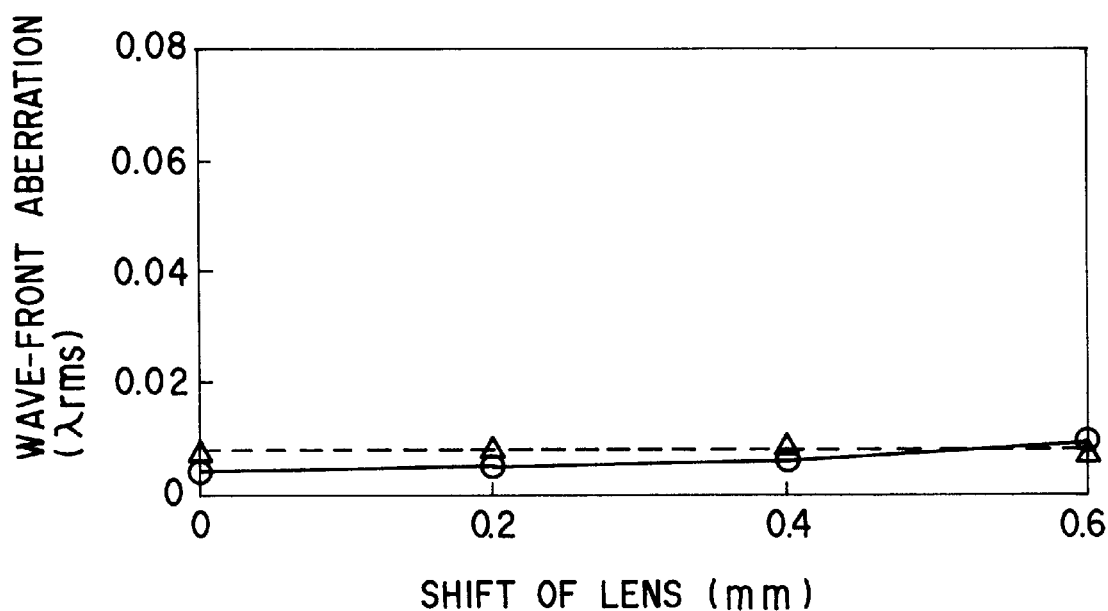
FIG. 29A is a graph showing how wave-front aberration changes with the distance the objective lens 16 is moved to achieve tracking control when the first light source is used.
Figure 29B:
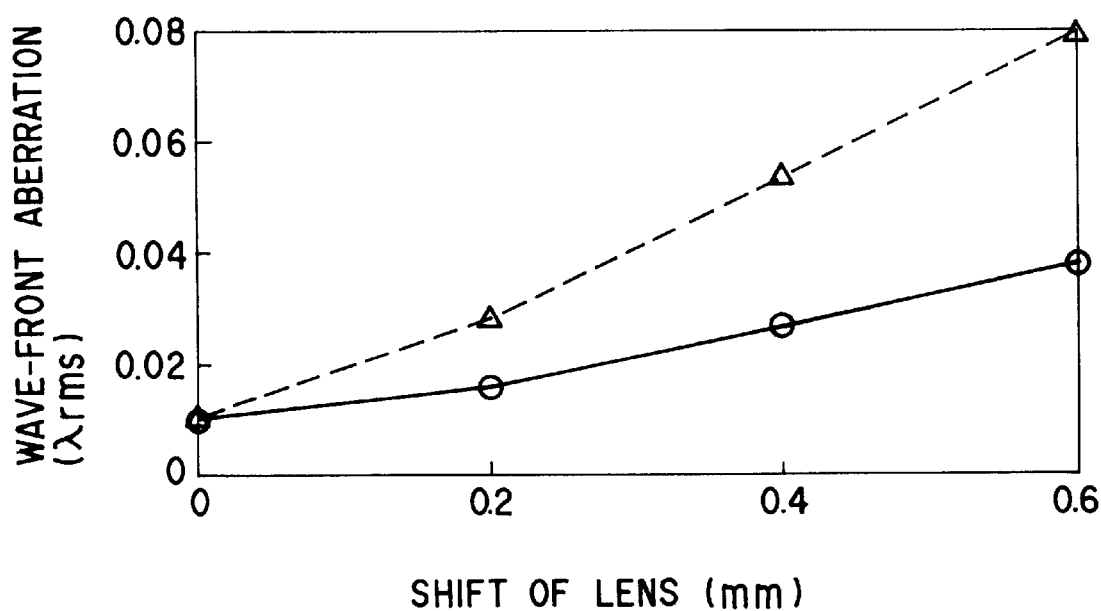
FIG. 29B is a graph showing how wave-front aberration changes with the distance the objective lens 16 is moved to achieve tracking control when the second light source is used.

FIG. 29A illustrates how the wave-front aberration changes with the distance the objective lens 16 is moved to achieve tracking control. FIG. 29B shows how the wave-front aberration changes with the distance the objective lens 16 is moved to achieve focusing control. The broken line in FIG. 29A indicates the aberration-distance relation observed when the first light source 11 is used to apply a laser beam to a DVD. The broken line in FIG. 29B shows the aberration-distance relation observed when the second light source 21 is used to apply a laser beam to a CD. The wave-front aberration determines the characteristics of the optical system incorporated in the optical head. It is required that the aberration should not exceed 0.04 λrms.

If the first light source 11 is located at the focal point A of the collimator lens 14 as shown in FIG. 28A, an apparent light source will exist at an infinitely long distance from the objective lens 16. The front-wave aberration scarcely increases, and the optical system of the head exhibits excellent characteristics. The characteristics of the optical system are degraded if the second light source 21 is located at a shorter distance from the collimator lens 14 than the focal point A thereof, as shown in FIG. 28B, so that a diverging beam may be applied from the lens 14 to the objective lens 16 in order to compensate the spherical aberration caused by the thick signal-recording substrate of the CD. In this case, an apparent light source exists to the objective lens 16. As the objective lens 16 is moved, the apparent light source moves. Consequently, an angle is formed between the beam emitted from the apparent light source and the optical axis of the lens 16. In other words, if the incidence angle is greater, inevitably degrading the characteristics of the optical system of the head.

Figure 28C:
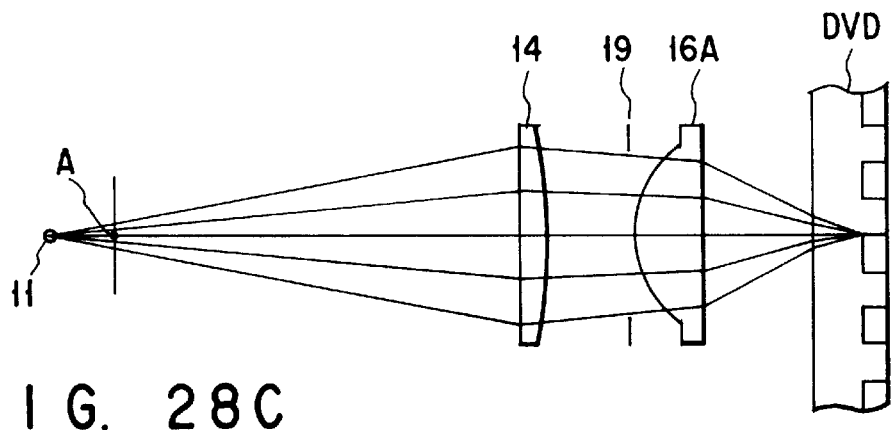
Figure 28D:
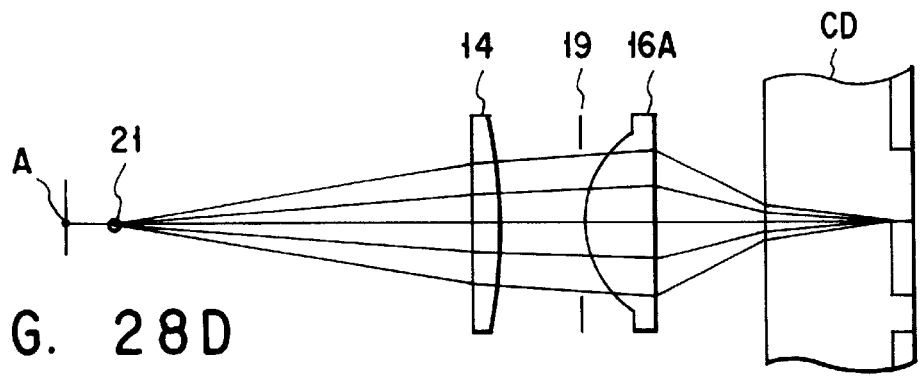

The optical systems illustrated in FIGS. 28C and 28D may be used in an another type of an optical disk apparatus according to the present invention. The system shown in FIG. 28C operates when the first light source 11 is used. The system shown in FIG. 28D operates when the second light source 21 is used.

In the system of FIG. 28C, the collimator lens 14 and the objective lens 16A are designed and arranged so that a laser beam may be applied to a DVD in a desired manner, or forms a spot on the signal-recording surface of the DVD. The first light source 11 is located at a longer distance from the collimator lens 14 than the focal point A thereof. In this case, the beam applied from the collimator lens 14 is a slightly converging one.

More precisely, the collimator lens 14 converges the laser beam emitted from the first light source 11. The dichroic filter 19 is set at the suitable numerical aperture so that the optical head can read data from a DVD. The objective lens 16A focused the beam on the signal-recording surface of the DVD. It should be noted that the lens 16A is designed on the basis of the optical load specific to either thick signal-recording substrate of the DVD. The laser beam reflected from the DVD passes through the lens 16A and is ultimately supplied through the first focusing-error detector 12 to the first photodetector 17. The first photodetector 17 converts the laser beam to an electric signal.

In the system of FIG. 28D, the collimator lens 14 and the objective lens 16A are designed and arranged so that a laser beam may be applied to a CD in a desired manner, or forms a spot on the signal-recording surface of the CD. The second light source 21 is located at a shorter distance from the lens 14 than the focal point A thereof, but not so short a distance from the lens 14 as in the case illustrated in FIG. 28B.

Since the light sources 11 and 21 are positioned with respect to the objective lens 16A as illustrated in FIGS. 28C and 28D, the spherical aberration caused by the thick signal-recording substrate of the CD is compensated, decreasing the front-wave aberration as indicated by the solid lines shown in FIGS. 29A and 29B.

Figure 30A:
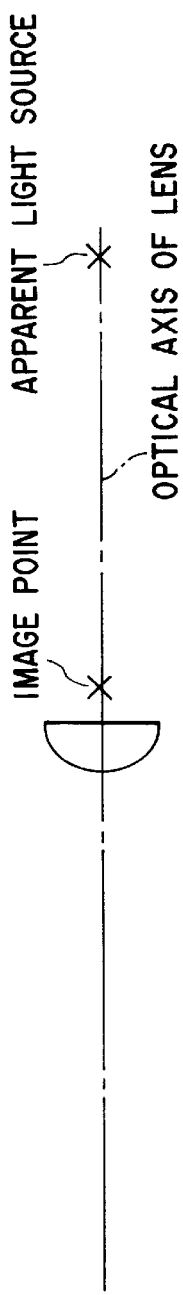
FIG. 30A to 30D are diagrams for explaining the incidence angles at which laser beams are applied to the objective lens in an optical head according to the present invention.
Figure 30B:
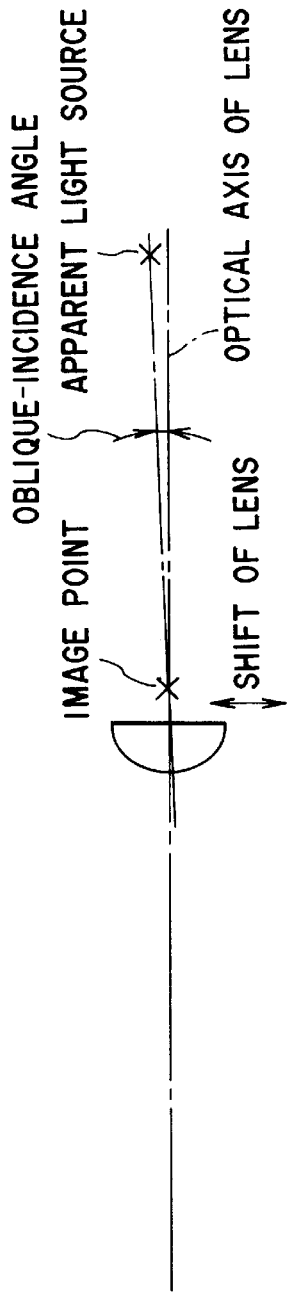
Figure 30C:
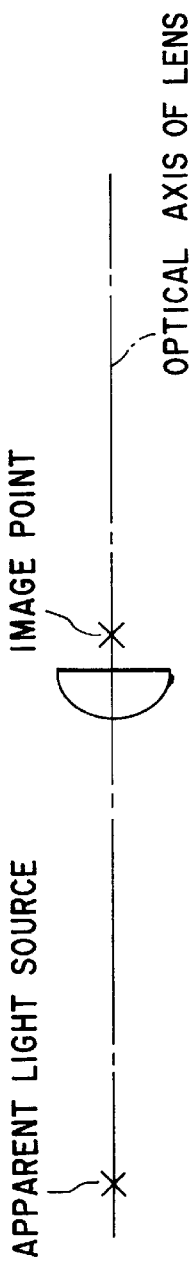

In the optical system of FIG. 28C designed to focus a laser beam on the signal-recording surface of a DVD, the beam applied to the objective lens 16A is a converging one. As shown in FIG. 30A, an apparent light source exists at an infinitely long distance from the objective lens 16A. Therefore, the incidence angle at which the laser beam is applied to the lens 16A when the lens 16A is moved is very small as illustrated in FIG. 30B, provided that the lens 16A has an appropriate magnifying power. As a result, the front-wave aberration does not much increase when the lens 16A is moved, as indicated by the solid line shown in FIG. 29A. This means that the optical system of FIG. 28C has good characteristics.

Front-wave aberration, if any in the optical system for the DVD, should be at λ=0.04 or less. If the front-wave aberration exceeds this value, the beam spot formed on the DVD will be an excessively large spot, a deformed beam spot or a ring of light.

Figure 30D:
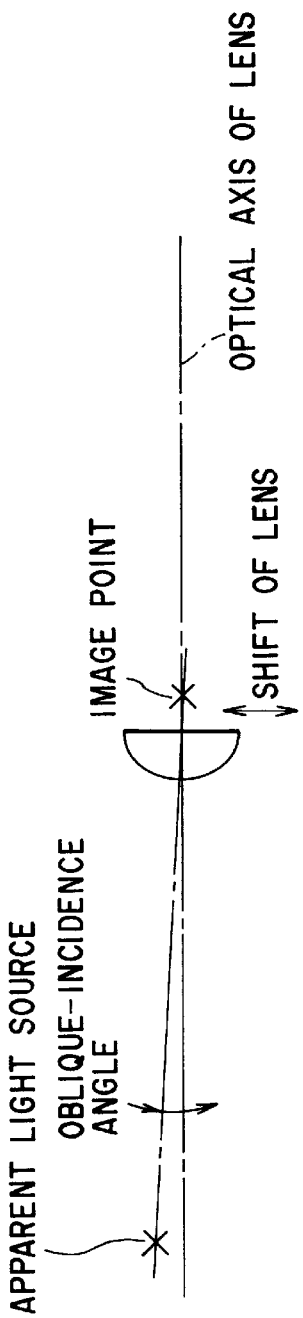

In the optical system of FIG. 28D designed to focus a laser beam on the signal-recording surface of a CD, the beam applied to the objective lens 16A is a diverging one. Hence, the spherical aberration caused by the thick signal-recording substrate of the CD is compensated. The second light source 21 is located at a shorter distance from the collimator lens 14 than the focal point A thereof, and not so short a distance from the lens 14 as in the case illustrated in FIG. 28B. Therefore, as shown in FIG. 30D, an apparent light source exists at a long distance from the objective lens 16A. The incidence angle at which the laser beam is applied to the lens 16A when the lens 16A is moved is smaller than in the optical system shown in FIG. 28B. As a result, the front-wave aberration does not exceed the upper tolerance limit even if the objective lens 16A is moved by 0.6 mm. The front-wave aberration does not much increase as indicated by the solid line shown in FIG. 29B. The optical system of FIG. 28D has so good characteristics that it can be used practically.

The front-wave aberration at the DVD is adjusted to about $\lambda=0.04$ or less. In other words, the light source provided for the DVD is located at a longer distance from the collimator lens than the focal point thereof. The light source provided for the CD is thereby located as close as possible to the focal point of the collimator lens 14. As a result, the front-wave aberration can be reduced which occurs when the objective lens is servo-controlled while the light source for the CD is used.

The present invention is not limited to the embodiments described above. Rather, various changes and modifications can be made without departing from the spirit and scope of the invention.

As has been described, the present invention can provide an optical head which suppresses wave-front aberration to have improved optical characteristics, even if the objective lens is moved across its optical axis.

The optical heads and optical disk apparatuses described above are of the types in can record data on and read data from a DVD and a CD. Nonetheless, the present invention can apply to an optical head and an optical disk apparatus which can record data on and read data from various optical disks including a DVD and a CD.

Figure 31:
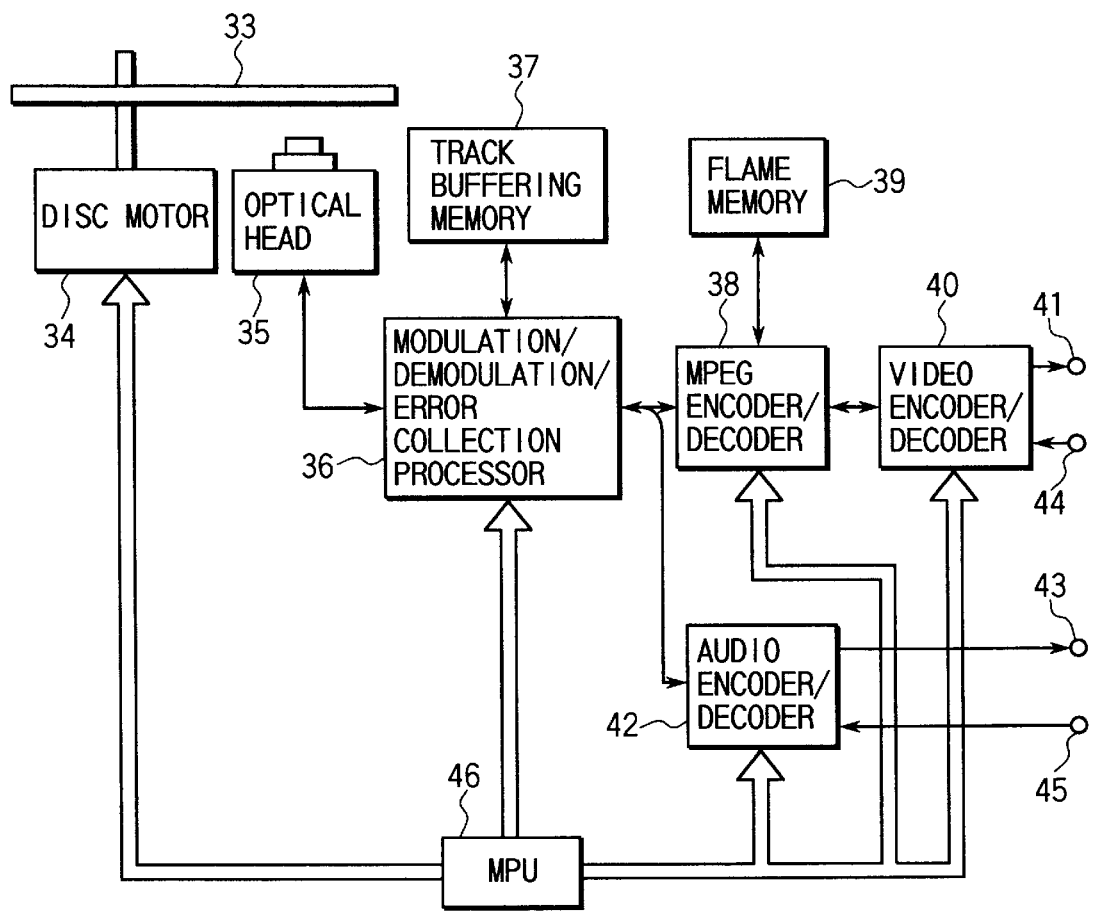
FIG. 31 is a schematic sectional view of the disk apparatus.

FIG. 31 shows an optical disk apparatus which incorporates an optical head 35 of the type described above. The apparatus can record image data and audio data on an optical disk 33 and can reproduce image data and audio data from the optical disk 33. The optical disk 33 can be rotated by a disk motor 34.

The optical head 35 opposes the recording surface of the optical disk 33. The optical head 35 applies a laser beam to the recording surface of the disk 33 to write data on the disk 33 or read data therefrom. The head 35 can be moved in the radial direction of the optical disk 33.

How data is reproduced from the optical disk 33 will be explained. The data the head 35 read from the disk 33 is supplied to a modulation/demodulation/error correction processor 36. The processor 36 demodulates the data and corrects errors in the data, by using a track buffering memory 37.

Of the data output from the processor 36, the image data is supplied to an MPEG (Moving Picture Image Coding Experts Group) encoder/decoder 38. The MPEG encoder/decoder 38 performs MPEG decoding on the image data supplied from the processor 36, by using a frame memory 39.

The image data output from the MPEG encoder/decoder 38 is decoded by a video encoder/decoder 40 and supplied to an output terminal 41. Of the data output from the processor 36, the audio data is decoded by an audio encoder/decoder 42 and supplied to an output terminal 43.

How data is recorded on the optical disk 33 will be explained. The image data supplied to an input terminal 44 is input to a video encoder/decoder 40 and encoded thereby. The image data thus encoded is supplied to the MPEG encoder/decoder 38. The MPEG encoder/decoder 38 encodes the image data by using the frame memory 39.

The audio data supplied to an input terminal 45 is input to an audio encoder/decoder 42 and encoded thereby. The image data output from the MPEG encoder 38 and the audio data output by the audio encoder/decoder 42 are supplied to the modulation/demodulation/error correction processor 36.

The processor 36 modulates the image data and the audio data and adds error-correction codes to the image data and audio data, by using the track buffering memory 37, so that both the image data and the audio data may be recorded on the optical disk 33. The data output from the processor 38 is recorded on the disk 33 by means of the optical head 35.

The disk motor 34, processor 36, MPEG encoder/decoder 38, video encoder/decoder 40 and audio encoder/decoder 42 are controlled by an MPU (Micro Processing Unit) 46.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

What is claimed is:

1. A dichroic filter comprising:

a light-transmitting substrate;

a first region provided on a part of the light-transmitting substrate, for allowing passage of a first light beam having a first wavelength and a second light beam having a second wavelength; and a second region surrounding the first region and covered with a dichroic film, for allowing passage of the first light beam and limiting passage of the second light beam.

2. A dichronic filter according to claim 1, wherein a first numerical aperture is formed when the first light beam passes through the first and second regions, and a second numeric aperture is formed when the second light beam passes through the first region.

3. A dichronic filter according to claim 2, wherein the second wavelength is longer than the first wavelength.

4. A dichroic filter according to claim 2, wherein the second numerical aperture is elliptical and about 0.43 along a tangent to a recording track of a disk and about 0.40 along a radius of the disk.

5. A dichroic filter comprising:

an objective lens;

a first region provided on a part of the light-transmitting substrate, for allowing passage of a first light beam having a first wavelength and a second light beam having a second wavelength; and a second region surrounding the first region and covered with a dichroic film, for allowing passage of the first light beam and limiting passage of the second light beam.

* * * * *